(12) United States Patent
Yamahira et al.

(10) Patent No.: US 11,449,361 B2
(45) Date of Patent: Sep. 20, 2022

(54) FUNCTIONAL SAFETY SYSTEM, SAFETY CONTROL METHOD FOR THE FUNCTIONAL SAFETY SYSTEM, AND FUNCTIONAL SAFETY PROGRAM

(71) Applicant: RENESAS ELECTRONICS CORPORATION, Tokyo (JP)

(72) Inventors: Toshiki Yamahira, Tokyo (JP); Toshihiro Kawano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 828 days.

(21) Appl. No.: 16/352,296

(22) Filed: Mar. 13, 2019

(65) Prior Publication Data
US 2019/0286091 A1 Sep. 19, 2019

(30) Foreign Application Priority Data
Mar. 15, 2018 (JP) .............................. JP2018-047618

(51) Int. Cl.
*G06F 9/50* (2006.01)
*G06F 9/48* (2006.01)
(Continued)

(52) U.S. Cl.
CPC ....... *G06F 9/5005* (2013.01); *G05B 19/0423* (2013.01); *G05B 19/0428* (2013.01);
(Continued)

(58) Field of Classification Search
CPC ........ G06F 9/48; G06F 9/4881; G06F 9/5005; G06F 11/30; G06F 11/3003;
(Continued)

(56) References Cited

U.S. PATENT DOCUMENTS

| 2005/0085967 A1* | 4/2005 | Mitsueda | ............... F02D 41/22 |
| | | | 714/E11.004 |
| 2017/0365992 A1* | 12/2017 | Shin | ......................... H02H 3/05 |

(Continued)

FOREIGN PATENT DOCUMENTS

JP 2010-271759 A 12/2010

*Primary Examiner* — Charles M Swift
(74) *Attorney, Agent, or Firm* — McDermott Will & Emery LLP

(57) ABSTRACT

In a semiconductor device according to the related art, unfortunately, a non-safety unit mounted on the same device as a safety unit is modified with low flexibility. According to one embodiment, a first semiconductor chip and a second semiconductor chip each have space domain separation hardware for limiting access to hardware resources in a functional safety system. Safety unit software and space domain and time domain separation software are executed in a time sharing manner. Based on a timer installed on the semiconductor chip, the space domain and time domain separation software performs separation for intermittently executing the safety unit software in a predetermined cycle, self-diagnosis for examining an operation of the safety unit software, and mutual diagnosis made between the first semiconductor chip and the second semiconductor chip to mutually diagnose the operation of the space domain and time domain separation software for performing the separation and the self-diagnosis.

20 Claims, 18 Drawing Sheets

(51) Int. Cl.
*G06F 11/30* (2006.01)
*G05B 19/042* (2006.01)

(52) U.S. Cl.
CPC .............. *G06F 9/48* (2013.01); *G06F 9/4881* (2013.01); *G06F 11/30* (2013.01); *G06F 11/3003* (2013.01); *G05B 2219/14061* (2013.01); *G05B 2219/24054* (2013.01); *G05B 2219/25257* (2013.01)

(58) Field of Classification Search
CPC ............ G05B 19/0428; G05B 23/0237; G05B 2219/14061; G05B 2219/24054; G05B 2219/25257; G05B 9/02; G05B 19/0423
See application file for complete search history.

(56) References Cited

U.S. PATENT DOCUMENTS

| | | | |
|---|---|---|---|
| 2017/0371578 A1* | 12/2017 | Wu | G06F 9/467 |
| 2018/0349235 A1* | 12/2018 | Freydel | G06F 11/182 |
| 2019/0278677 A1* | 9/2019 | Terechko | G06F 11/2236 |

* cited by examiner

FIG. 10

| | CONTENTS | SET VALUE |
|---|---|---|
| TIME DOMAIN/ SPACE DOMAIN SEPARATION S/W | FUNDAMENTAL PERIOD | 10.0ms |
| | WINDOW TIME | 1.0ms |
| | EXECUTION ORDER | 1 |
| | USED AREA ADDRESS RANGE (ROM) | H'xxxx0000-H'xxxx0FFF |
| | USED AREA ADDRESS RANGE (RAM) | H'xxxx5000-H'xxxx5FFF |
| | USED AREA ADDRESS RANGE (PERIPHERY) | H'xxxxA000-H'xxxxAFFF |
| | ⋮ | ⋮ |
| SAFETY UNIT S/W | WINDOW TIME | 0.5ms |
| | EXECUTION ORDER | 2, 4 |
| | USED AREA ADDRESS RANGE (ROM) | H'xxxx1000-H'xxxx1FFF |
| | USED AREA ADDRESS RANGE (RAM) | H'xxxx6000-H'xxxx6FFF |
| | USED AREA ADDRESS RANGE (PERIPHERY) | H'xxxxB000-H'xxxxBFFF, H'xxxxD000-H'xxxxDFFF |
| | ⋮ | ⋮ |
| NON-SAFETY UNIT S/W | WINDOW TIME | 4.0ms |
| | EXECUTION ORDER | 3, 5 |
| | USED AREA ADDRESS RANGE (ROM) | H'xxxx2000-H'xxxx2FFF |
| | USED AREA ADDRESS RANGE (RAM) | H'xxxx7000-H'xxxx7FFF |
| | USED AREA ADDRESS RANGE (PERIPHERY) | H'xxxxC000-H'xxxxCFFF |
| | ⋮ | ⋮ |

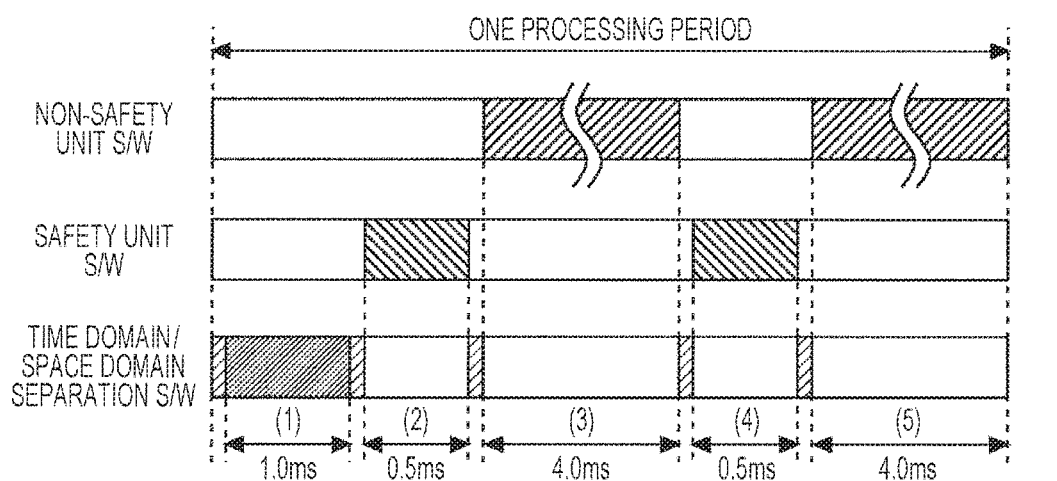

FIG. 14
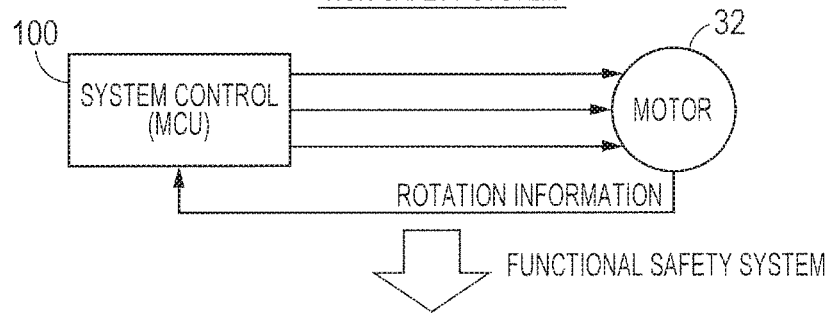
NON-SAFETY SYSTEM
↓ FUNCTIONAL SAFETY SYSTEM
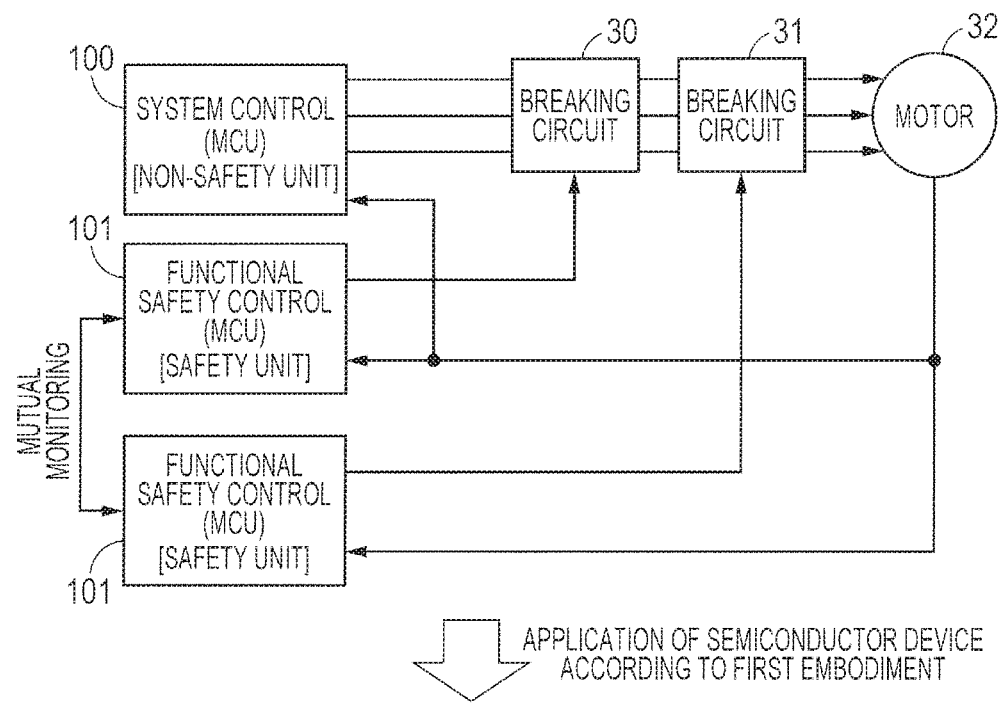
DUAL CONFIGURATION SAFETY SYSTEM (COMPARATIVE EXAMPLE)
↓ APPLICATION OF SEMICONDUCTOR DEVICE ACCORDING TO FIRST EMBODIMENT
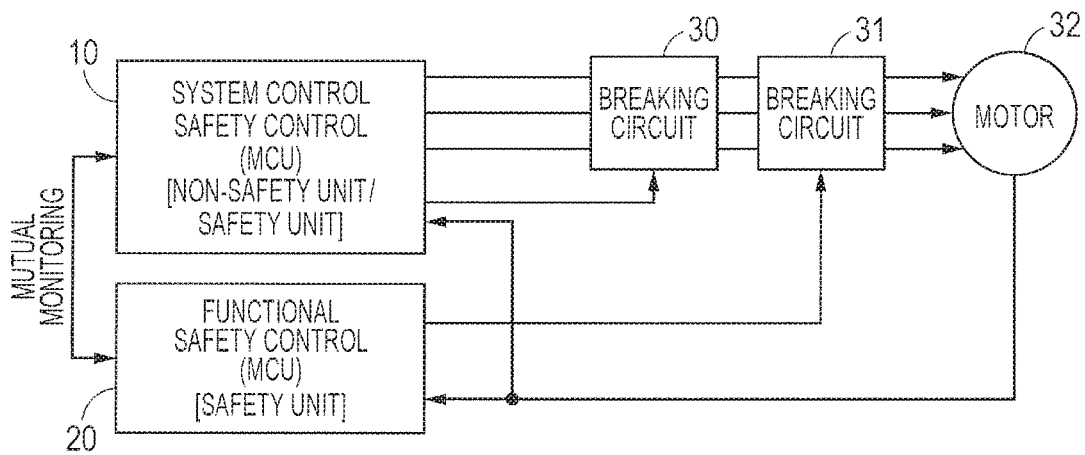
DUAL CONFIGURATION SAFETY SYSTEM (FIRST EMBODIMENT)

FUNCTIONAL SAFETY SYSTEM, SAFETY CONTROL METHOD FOR THE FUNCTIONAL SAFETY SYSTEM, AND FUNCTIONAL SAFETY PROGRAM

CROSS-REFERENCE TO RELATED APPLICATIONS

The disclosure of Japanese Patent Application No. 2018-047618 filed on Mar. 15, 2018 including the specification, drawings and abstract is incorporated herein by reference in its entirety.

TECHNICAL FIELD OF THE INVENTION

The present invention relates to a functional safety system, a safety control method for the functional safety system, and a functional safety program. For example, the present invention relates to a functional safety system including a safety unit that controls functional safety and a non-safety unit to be protected by the functional safety, a safety control method for the functional safety system, and a functional safety program.

BACKGROUND

For industrial machines, functional safety is necessary to safely stop a machine operation in the event of a machine failure. In a machine with the functional safety, a normal operation of a safety unit for safely stopping the machine needs to be ensured in the event of a machine failure or a malfunction. Thus, high reliability is necessary for the safety unit. Japanese Unexamined Patent Application Publication No. 2010-271759 discloses an example of a machine with the functional safety.

In a safety control unit described in Japanese Unexamined Patent Application Publication No. 2010-271759, the OS is implemented by a processor. When an abnormality is detected by a safety monitoring process, a normal control scheduling pattern is switched to a safety control scheduling pattern so as to schedule a safety monitoring process and a safety control process. In this case, the normal control scheduling pattern applied before the detection of an abnormality includes a first time partition for allocating an execution time to a normal control process and a second time partition for allocating a processor execution time to the safety monitoring process. Moreover, the safety control scheduling pattern applied after the detection of an abnormality includes a third time partition for allocating an execution time to the safety control process and a fourth time partition for allocating an execution time to the safety monitoring process.

SUMMARY

In the safety control unit described in Japanese Unexamined Patent Application Publication No. 2010-271759, a safety unit for controlling functional safety (e.g., the safety monitoring process and the safety control process) and a non-safety unit that does not control functional safety (e.g., the normal control process) are implemented on the single processor. In the case of a combination of the safety unit and the non-safety unit on a single device, the reliability of the non-safety unit needs to be increased as the safety unit according to functional safety standards (e.g., IEC61508), making it difficult to modify the non-safety unit. Thus, for greater flexibility in the modification of the non-safety unit, the non-safety unit needs to be separated from the safety unit so as to prevent interference between the operations of the safety unit and the non-safety unit. Unfortunately, in the safety control unit described in Japanese Unexamined Patent Application Publication No. 2010-271759, separation between the non-safety unit and the safety unit is not sufficiently ensured, so that the non-safety unit cannot be freely modified.

Other problems and new features will be clarified by the description and the accompanying drawings of the present specification.

According to one embodiment, in a functional safety system, a first semiconductor chip and a second semiconductor chip each have an independently operating timer and space domain separation hardware for limiting hardware resources accessible by each piece of software. Safety unit software and space domain and time domain separation software are executed in a time sharing manner. Based on the timer installed on the semiconductor chip, the space domain and time domain separation software performs separation for intermittently executing the safety unit software in a predetermined cycle, self-diagnosis for examining an operation of the safety unit software, and mutual diagnosis made between the first semiconductor chip and the second semiconductor chip to mutually diagnose the operation of the space domain and time domain separation software for performing the separation and the self-diagnosis.

According to the embodiment, the functional safety system ensures the separation of the safety unit software from non-safety unit software installed on the same semiconductor chip as the safety unit software.

BRIEF DESCRIPTION OF THE DRAWINGS

FIG. 10 is a table for explaining a first example of an operation set value provided for the functional safety system according to the first embodiment;

FIG. 14 is a block diagram for explaining a system configuration example of the functional safety system according to the first embodiment;

DETAILED DESCRIPTION

Figure 1:
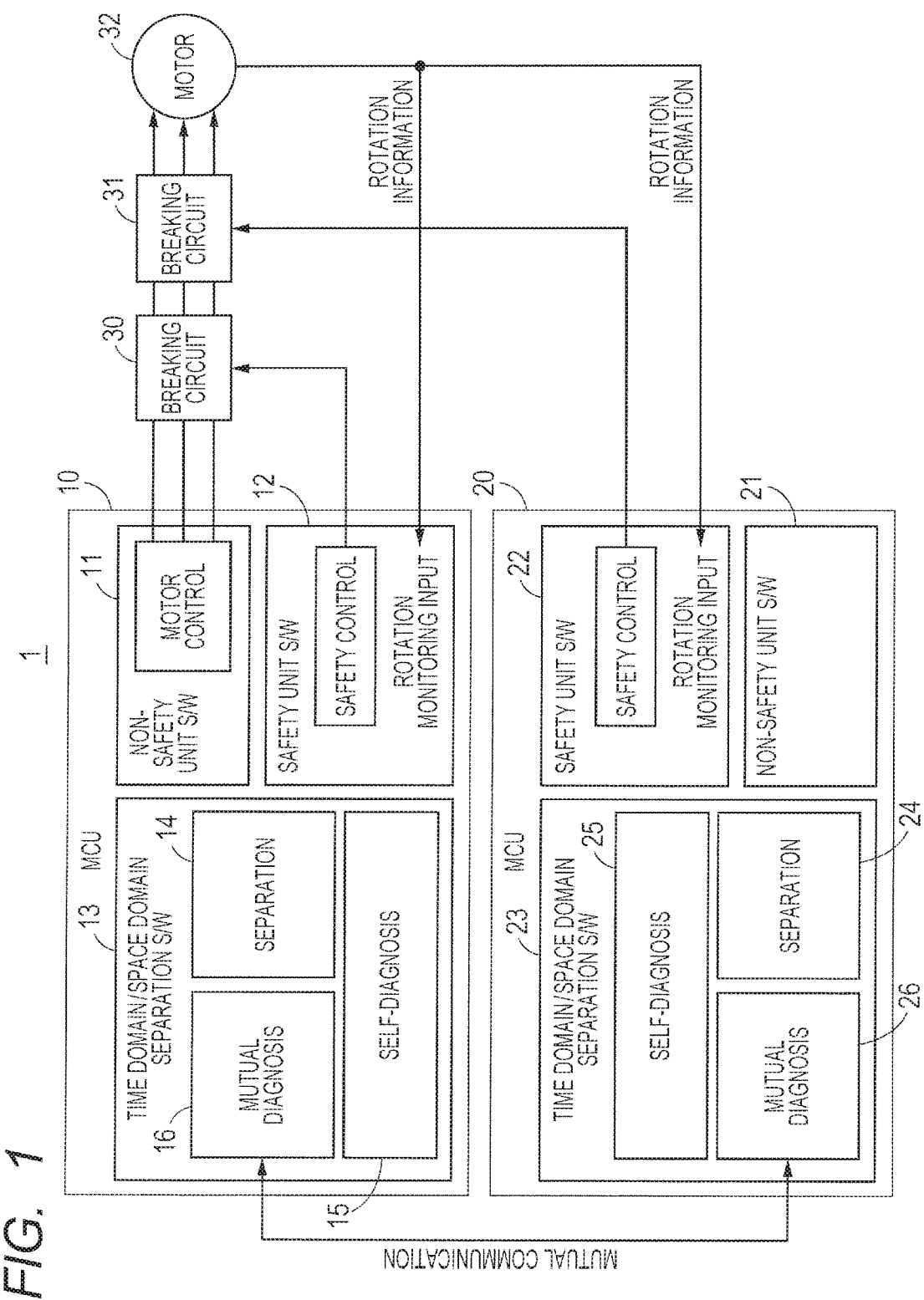
FIG. 1 is a block diagram showing a functional safety system according to a first embodiment.

For clarification of the explanation, the following description and drawings are optionally omitted and simplified. Moreover, elements illustrated as functional blocks for various kinds of processing in the drawings can be configured by hardware including a central processing unit (CPU), memory, and other circuits and implemented by software including programs loaded in the memory. Thus, a person skilled in the art could understand that these functional blocks can be implemented in various forms, for example, by hardware alone, software alone, or a combination of hardware and software. The forms of the functional blocks are not particularly limited. The same elements are indicated by the same reference numerals in the drawings and the redundant explanation is optionally omitted.

The programs can be provided for computers while being stored using various kinds of non-transitory computer readable media. The non-transitory computer readable media include various kinds of tangible recording media. Examples of non-transitory computer readable media include a magnetic recording medium (e.g., a flexible disk, a magnetic tape, and a hard disk drive), a magneto-optical recording medium (e.g., a magneto-optical disk), a CD-ROM (Read Only Memory), a CD-R, a CD-R/W, and a semiconductor memory (e.g., a mask ROM, a PROM (Programmable ROM), an EPROM (Erasable PROM), a flash ROM, or a RAM (Random Access Memory)). The programs may be provided for computers by using various kinds of transitory computer readable media. Examples of the transitory computer readable media include an electric signal, an optical signal, and an electromagnetic wave. The transitory computer readable media can supply programs for computers through wire communication lines including an electric wire and an optical fiber, or radio communication lines.

First Embodiment

FIG. 1 is a block diagram illustrating a functional safety system 1 according to a first embodiment. The example of FIG. 1 shows a system for controlling a motor 32 with functional safety. However, circuits to be controlled by the functional safety system 1 may include various functions in addition to the motor.

As shown in FIG. 1, the functional safety system 1 according to the first embodiment includes a first semiconductor chip 10, a second semiconductor chip 20, breaking circuits 30 and 31, and the motor 32. The first semiconductor chip 10 and the second semiconductor chip 20 are micro controller units (MCUs), each including an arithmetic section for executing a program and a peripheral circuit where a memory and various functions are implemented by the arithmetic section. The arithmetic section and the peripheral circuit are formed on a single semiconductor chip.

In the functional safety system 1 according to the first embodiment, the first semiconductor chip 10 performs functional control (e.g., motor rotation control) for controlling a circuit to be controlled (e.g., the motor 32) and performs functional safety control in which safety control is performed on functional control (motor rotation control). The second semiconductor chip 20 performs at least functional safety control on functional control.

Thus, as shown in FIG. 1, the first semiconductor chip 10 executes non-safety unit software 11 and safety unit software 12 in a timesharing manner. The non-safety unit software 11 is system control software for controlling the motor 32. In FIG. 1, the motor control of the non-safety unit software 11 is illustrates as a single processing block. The safety unit software 12 acquires rotation information from the motor 32 and performs functional safety control for controlling the breaking circuit 30 so as to stop the motor 32 when an abnormality of the rotation control of the motor 32 is detected and an abnormality is found. In FIG. 1, the safety control of the safety unit software 12 is illustrated as a single processing block.

Furthermore, the second semiconductor chip 20 executes non-safety unit software 21 and safety unit software 22 in a timesharing manner. The non-safety unit software 21 executed in the second semiconductor chip 20 performs different processing from the rotation control of the motor 32. The non-safety unit software 21 may be installed or may not be installed on the second semiconductor chip 20. The safety unit software 22 acquires rotation information from the motor 32 and performs functional safety control for controlling the breaking circuit 31 so as to stop the motor 32 when an abnormality of the rotation control of the motor 32 is detected and an abnormality is found. In FIG. 1, the safety control of the safety unit software 22 is illustrated as a single processing block.

Furthermore, in the functional safety system 1 according to the first embodiment, the first semiconductor chip 10 and the second semiconductor chip 20 execute time domain and space domain separation software 13 and 23 that performs time domain separation and space domain separation on the non-safety unit software and the safety unit software on each of the chips. The time domain separation is to separate the execution times of the non-safety unit software and the safety unit software. The space domain separation is to separate hardware resources (e.g., a memory and a peripheral circuit) used by the non-safety unit software and the safety unit software. FIG. 1 illustrates separation blocks 14 and 24 as processing blocks for the time domain separation and the space domain separation.

Moreover, the time domain and space domain separation software 13 and 23 performs self-diagnosis and mutual diagnosis. In the self-diagnosis, the correctness of an operation of the safety unit software executed in the chip is diagnosed. In the mutual diagnosis, the correctness of an operation of the time domain and space domain separation software 13 and the correctness of an operation of the time domain and space domain separation software 23 are alternately diagnosed. FIG. 1 illustrates self-diagnosis blocks 15 and 25 as processing blocks for the self-diagnosis and mutual diagnosis blocks 16 and 26 as processing blocks for the mutual diagnosis.

The processing blocks in FIG. 1 basically indicate software operations that use the hardware resources in the semiconductor chips.

Figure 2:
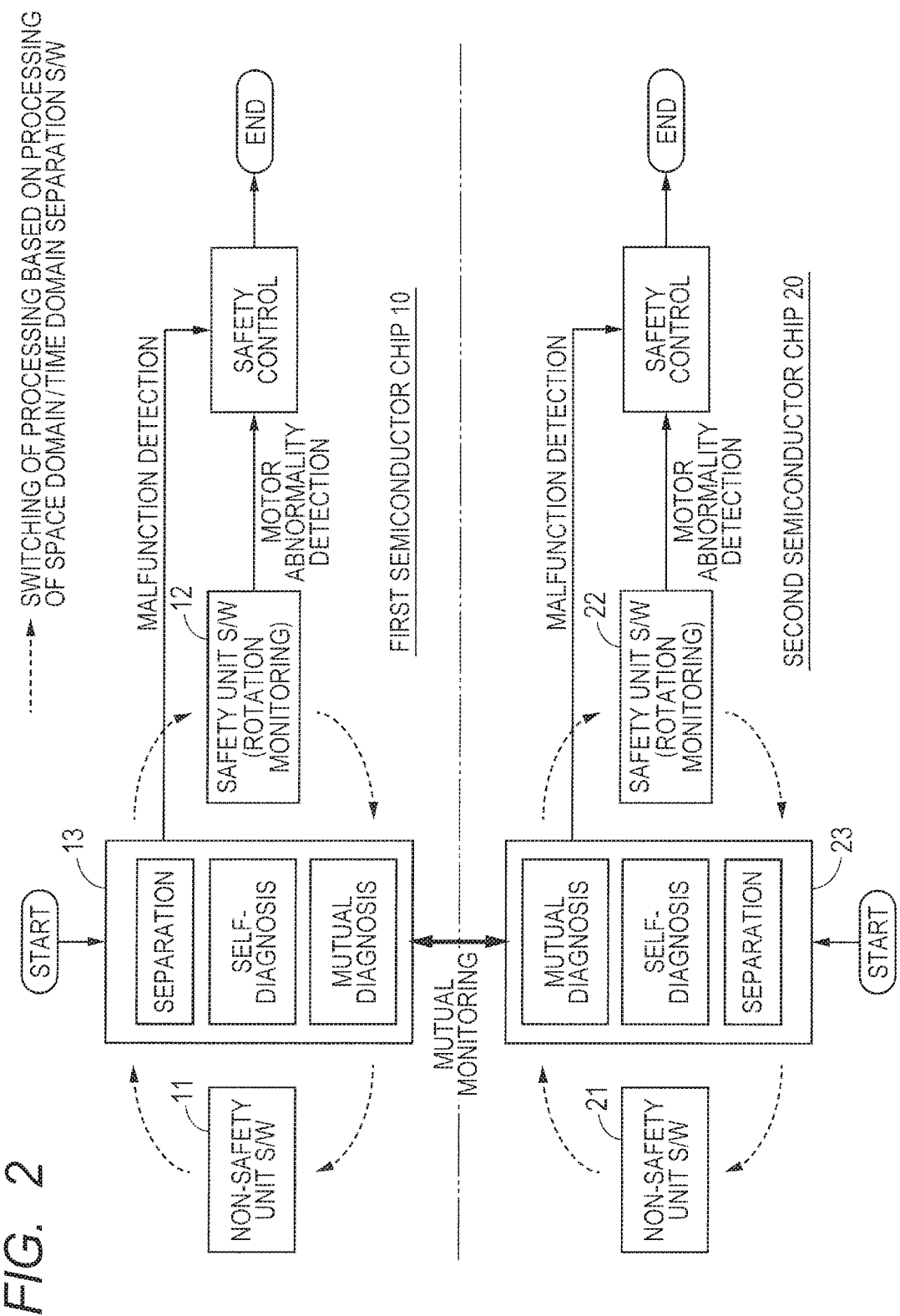
FIG. 2 is a flowchart showing the processing flow of the functional safety system according to the first embodiment.

The operations of the functional safety system 1 illustrated in FIG. 1 will be discussed below. FIG. 2 is a flowchart showing the processing flow of the functional safety system according to the first embodiment. As shown in FIG. 2, in the functional safety system 1 according to the first embodiment, the first semiconductor chip 10 and the second semiconductor chip 20 perform the same processing while switching software to be executed. Specifically, the first semiconductor chip 10 and the second semiconductor chip 20 execute the non-safety unit software and the safety unit software, which are switched in a predetermined cycle, through the processing of the time domain and space domain separation software. Furthermore, the first semiconductor chip 10 and the second semiconductor chip 20 perform at least one of the separation, the self-diagnosis, and the mutual diagnosis at the time of execution of the time domain and space domain separation software. The time domain and space domain separation software 13 and the time domain and space domain separation software 23 mutually monitor the operations during the mutual diagnosis. The operation of the time domain and space domain separation software 13 will be specifically discussed later.

If a malfunction is detected in the processing of the time domain and space domain separation software 13 and 23, the first semiconductor chip 10 and the second semiconductor chip 20 complete the operations after enabling the safety control of the safety unit software so as to stop the system. If an abnormality of the motor 32 is detected in the processing of the non-safety unit software 11 and 21, the first semiconductor chip 10 and the second semiconductor chip 20 complete the operations after enabling the safety control of the safety unit software so as to stop the system. In the event of an abnormality in an industrial machine, repairment or a special operation is required for safety control before the system is restored to an operating state. This is necessary for preventing the spread of an accident or a failure.

In the functional safety system 1 according to the first embodiment, the hardware of the first semiconductor chip 10 and the second semiconductor chip 20 is controlled by the software, securing the separation of the non-safety unit software and the safety unit software. The first semiconductor chip 10 and the second semiconductor chip 20 according to the first embodiment are identical in configuration but may vary in configuration and throughput.

Figure 3:
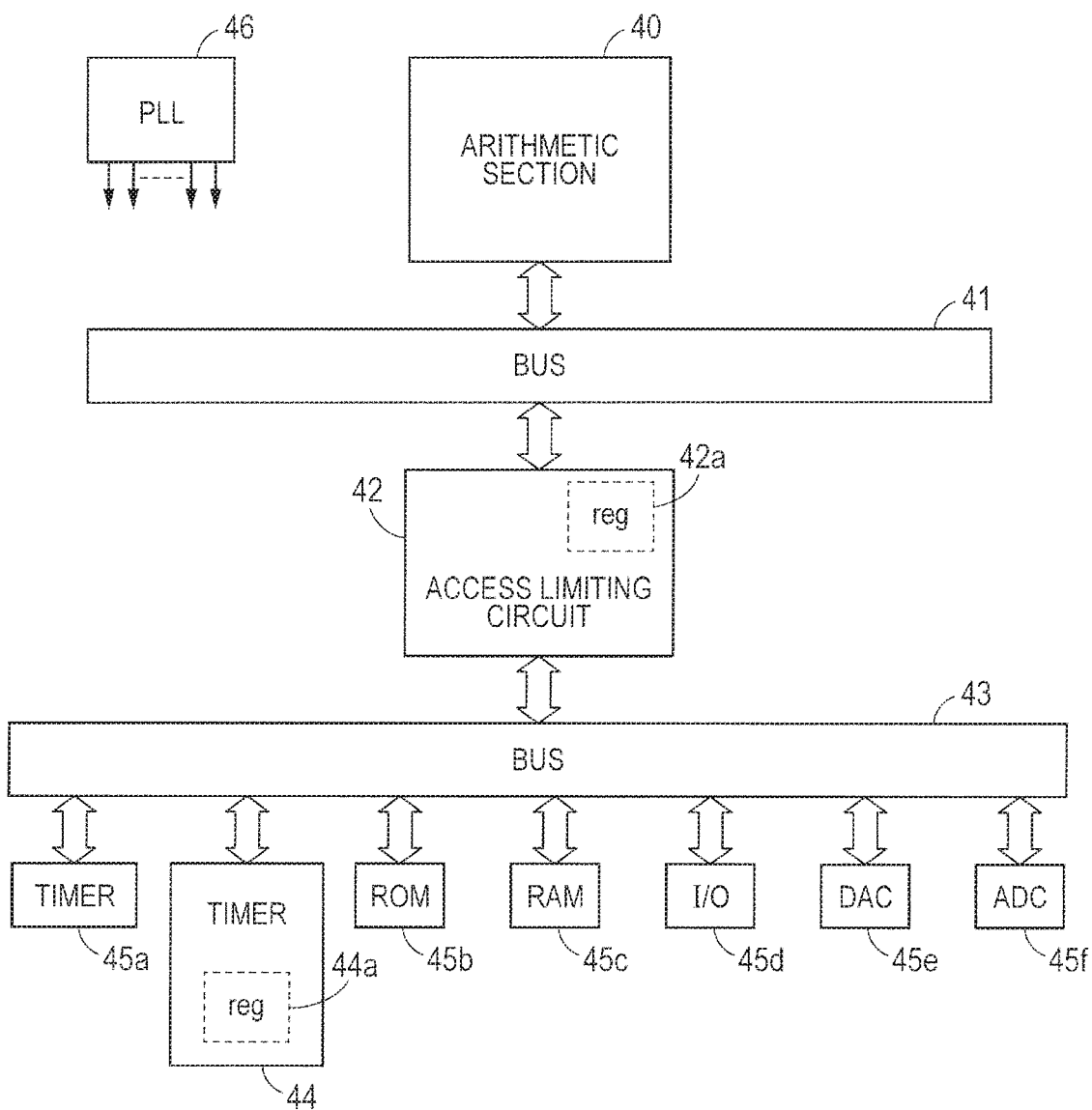
FIG. 3 is a block diagram showing a semiconductor chip used in the functional safety system according to the first embodiment.

FIG. 3 is a block diagram of the semiconductor chip used in the functional safety system according to the first embodiment. FIG. 3 illustrates an example of the first semiconductor chip 10 and the second semiconductor chip 20. In FIG. 3, the semiconductor chip 10 is illustrated as an example.

As shown in FIG. 3, the first semiconductor chip 10 includes an arithmetic section 40, buses 41 and 43, a space domain separation hardware (e.g., an access limiting circuit 42), a timer 44, peripheral circuits, and a phase locked loop (PLL) circuit 46. In the example of FIG. 2, a timer 45a, examples of the peripheral circuits are a read only memory (ROM) 45b, a random access memory (RAM) 45c, an input/output interface 45d, a digital-to-analog converter circuit 45e, and an analog-to-digital converter circuit 45f.

The PLL circuit 46 generates a clock signal and distributes the signal to each block in the first semiconductor chip 10. The bus 41 couples the arithmetic section 40 and the access limiting circuit 42. The bus 43 couples the access limiting circuit 42, the timer 44, the timer 45a, the ROM 45b, the RAM 45c, the input/output interface 45d, the digital-to-analog converter circuit 45e, and the analog-to-digital converter circuit 45f. The access limiting circuit 42, the timer 44, the timer 45a, the ROM 45b, the RAM 45c, the input/output interface 45d, the digital-to-analog converter circuit 45e, and the analog-to-digital converter circuit 45f are hardware resources used by software executed in the arithmetic section 40.

The arithmetic section 40 executes the non-safety unit software 11, the safety unit software 12, and the time domain and space domain separation software 13 in a timesharing manner. The timer 44 includes a register 44a. The timer 44 counts down from a count start value, which is a window time value stored in the register 44a, in response to the clock signal outputted from the PLL circuit 46. When the count value reaches a predetermined timeout value, the timer 44 issues an interrupt signal to the arithmetic section 40. The time domain and space domain separation software 13 is executed by the arithmetic section 40 in response to the issuance of the interrupt signal from the timer 44. The access limiting circuit 42 includes a register 42a. The access limiting circuit 42 limits, for example, the range of accessible peripheral circuits for each piece of the software based on an access limit set value stored in the register 42a. In other words, the access limiting circuit 42 imposes an access limit so as to limit the range of accessible hardware resources for each piece of the software.

Figure 4:
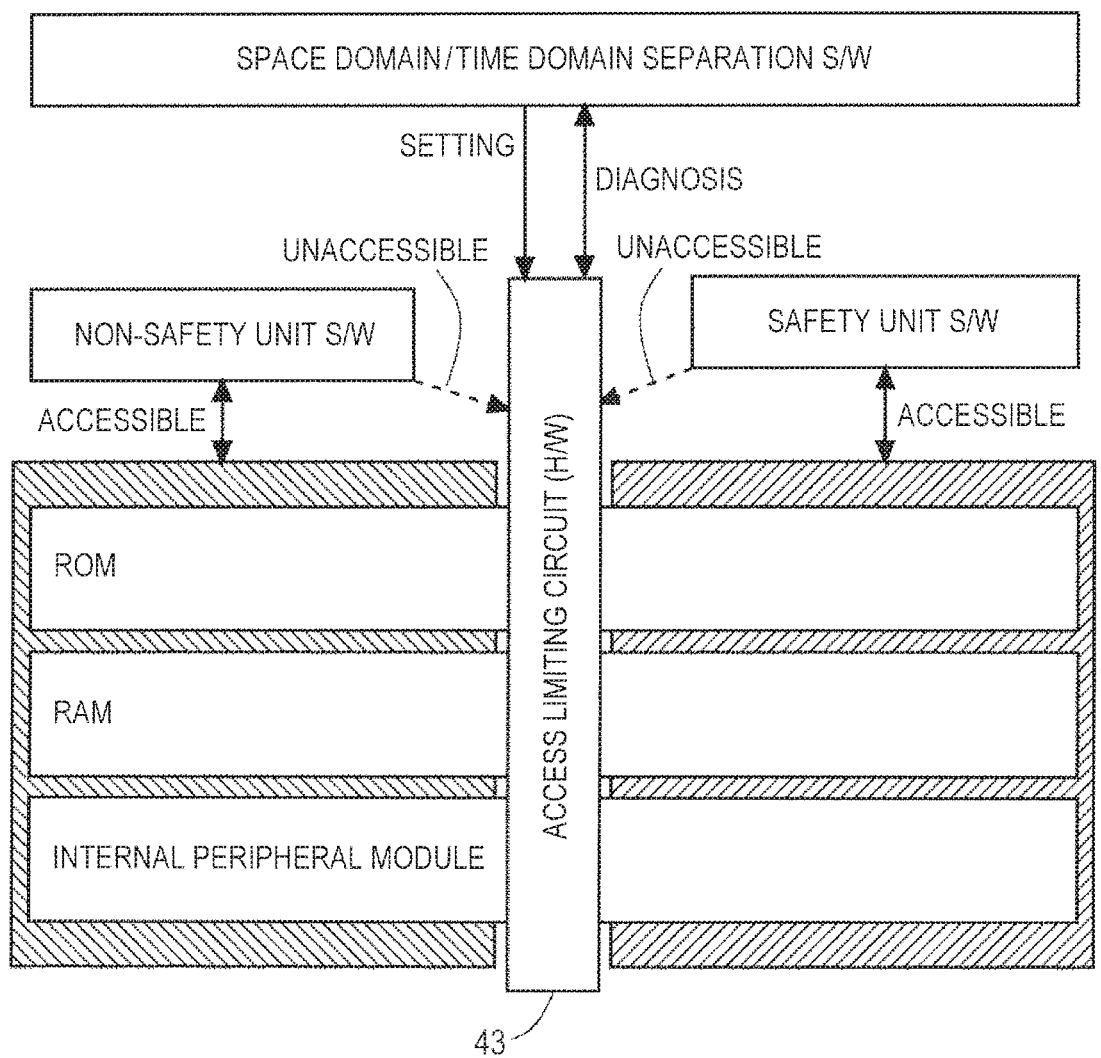
FIG. 4 is a block diagram for explaining a state of space domain separation in the functional safety system according to the first embodiment.

The state of space domain separation by the access limiting circuit 42 and the software executed by the arithmetic section 40 will be discussed below. FIG. 4 is a block diagram illustrating the state of space domain separation by the functional safety system according to the first embodiment. The block diagram in FIG. 4 is a conceptual block diagram in which the hardware resources are used by the software executed by the arithmetic section 40.

As shown in FIG. 4, in the functional safety system 1 according to the first embodiment, the time domain and space domain separation software 13 provides the register 42a with the access limit set value that determines the access limit range of the access limiting circuit 42, allowing the access limiting circuit 42 to determine an accessible range for each piece of the software. Thus, the access limiting circuit 42 permits access only from the non-safety unit software 11 to the range of the hardware resources accessible by the non-safety unit software 11. If the safety unit software 12 accesses an accessible range allocated to the non-safety unit software 11, the access limiting circuit 42 prohibits the access. Moreover, the access limiting circuit 42 permits access only from the non-safety unit software 11 to the range of the hardware resources accessible by the non-safety unit software 11. If the safety unit software 12 accesses an accessible range allocated to the non-safety unit software 11, the access limiting circuit 42 prohibits the access. Moreover, the access limiting circuit 42 permits access only from the safety unit software 12 to the range of the hardware resources accessible by the safety unit software 12. If the non-safety unit software 11 accesses an accessible range allocated to the safety unit software 12, the access limiting circuit 42 prohibits the access.

As described above, in the functional safety system 1 according to the first embodiment, the time domain and space domain separation software 13 sets the access limit range of the access limiting circuit 42, allowing spatial separation of the hardware resources on the first semiconductor chip 10. Furthermore, in the functional safety system 1 according to the first embodiment, the hardware resources used by the non-safety unit software 21 and the safety unit software 22 are spatially separated on the second semiconductor chip 20 as on the first semiconductor chip 10.

Thus, the functional safety system 1 according to the first embodiment includes the first semiconductor chip 10 that performs functional control (e.g., motor rotation control) for controlling a circuit to be controlled and performs functional safety control in which safety control is performed on functional control, and the second semiconductor chip 20 that performs at least functional safety control on functional control. The first semiconductor chip 10 and the second semiconductor chip 20 each include the arithmetic section 40 that executes pieces of software in a timesharing manner, hardware resources (e.g., peripheral circuits) used by the software executed by the arithmetic section 40, space domain separation hardware (e.g., the access limiting circuit 42) that limits access to the range of hardware resources accessible by each piece of the software, and the timer 44 that counts an execution time for each piece of the software in the arithmetic section 40. Moreover, in the arithmetic sections 40 of the first semiconductor chip 10 and the second semiconductor chip 20, the safety unit software 12 for functional safety control and the space domain and time domain separation software 13 for separation, self-diagnosis, and mutual diagnosis are executed while being switched in a predetermined cycle based on the count result of the timer 44 on the semiconductor chip. In the first semiconductor chip 10, the non-safety unit software 11 is executed in a predetermined cycle in addition to the safety unit software 12 and the time domain and space domain separation software 13. In the second semiconductor chip 20, it is only necessary to execute at least the safety unit software 12 and the time domain and space domain separation software 13. In the present specification, it is assumed that the non-safety unit software 11 is executed in the second semiconductor chip 20 as in the first semiconductor chip 10.

The separation, self-diagnosis, and mutual diagnosis of the time domain and space domain separation software 13 will be more specifically discussed below.

In the functional safety system 1 according to the first embodiment, the separation, self-diagnosis, and mutual diagnosis are performed in the time domain and space domain separation software 13 and 24. In the separation, setting correctness diagnosis is made to diagnose the correctness of an access limit set value that is the set value of an access limit imposed by the access limiting circuit 42 for each piece of the software executed by the arithmetic section 40, and the access limit set value is rewritten. Furthermore, in the separation, a separation signature value is generated to indicate operation history information on the setting correctness diagnosis and the rewriting.

In the self-diagnosis, it is diagnosed whether the safety unit software 12 has normally run based on a safety unit signature value that describes operation history information on the safety unit software 12, the information being generated by the safety unit software 12. In the mutual diagnosis, mutual diagnosis signature values including a self-separation signature value and a safety unit signature value are generated, the first semiconductor chip 10 and the second semiconductor chip 20 transmit and receive the mutual diagnosis signature values to and from each other, and the correctness of the mutual diagnosis signature value received from the other is diagnosed.

Figure 5:
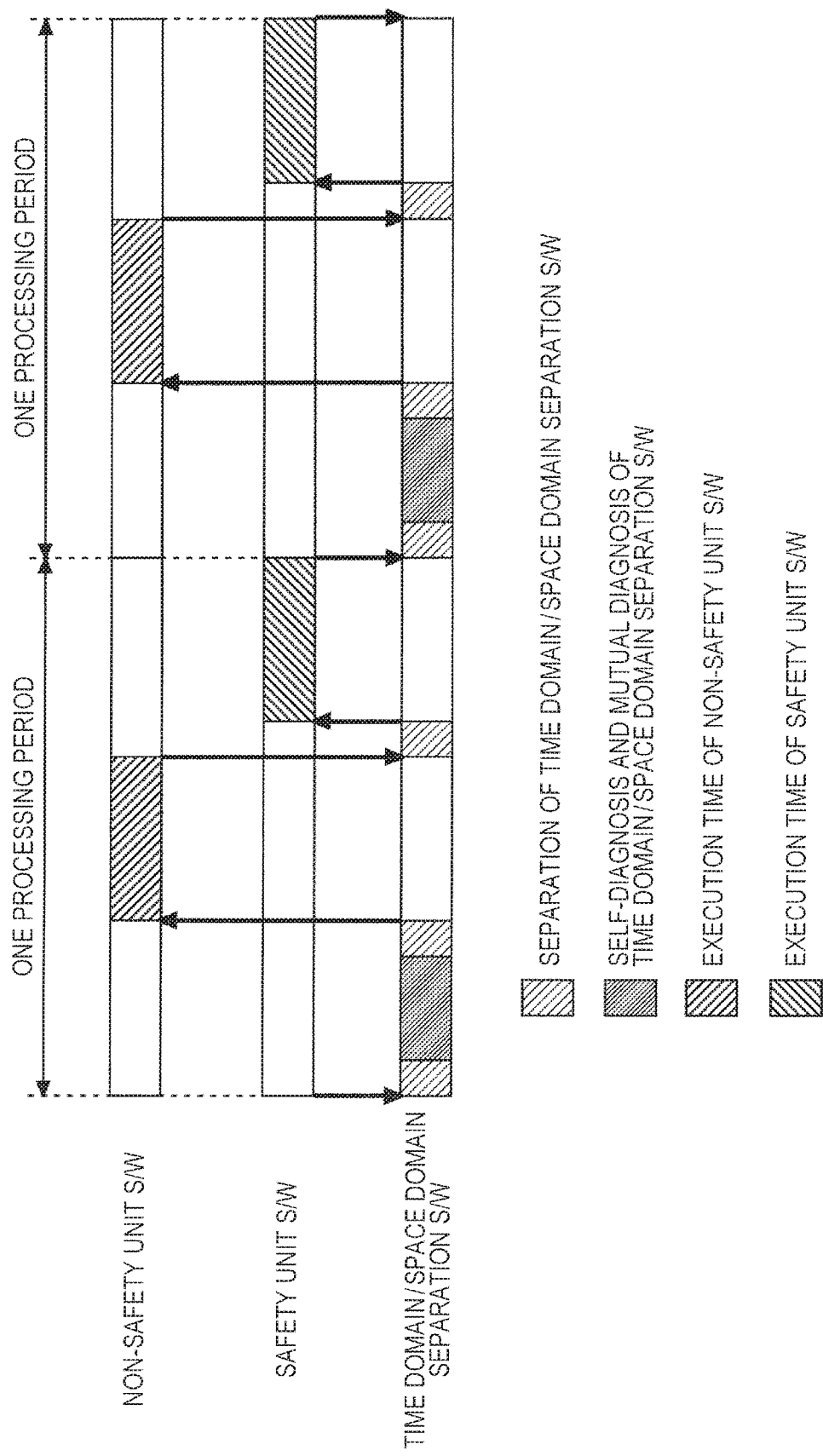
FIG. 5 is a timing chart for explaining the operation of the functional safety system according to the first embodiment.

The operations of the functional safety system 1 according to the first embodiment will be discussed below. In the following explanation, an operation on the first semiconductor chip 10 is similar to that of the second semiconductor chip 20. FIG. 5 is a timing chart showing the operations of the functional safety system 1 according to the first embodiment. As shown in FIG. 5, in the functional safety system 1 according to the first embodiment, a basic period (a processing period in FIG. 5) including at least one of the operations of the non-safety unit software 11, the safety unit software 12, and the time domain and space domain separation software 13 is repeatedly performed such that the software is executed in a switching manner in the basic period.

In the functional safety system 1 according to the first embodiment, the length of the basic period and the execution state of the software in the basic period are set by providing an operation set value for the time domain and space domain separation software 13 from the outside. For example, the operation set value describes the execution time of the software, the fundamental period (e.g., the length of the fundamental period) indicating the length of the switching period of the software, and the execution order of the software in the fundamental period.

In the example of FIG. 5, the time domain and space domain separation software 13, the non-safety unit software 11, and the safety unit software 12 are sequentially executed once in the fundamental period. The time domain and space domain separation software 13 performs separation each time the execution of the software is switched. In addition to simple switching of the software in the functional safety system 1 according to the first embodiment, the software executed by the arithmetic section 40 through the separation by the time domain and space domain separation software 13 is switched.

Figure 6:
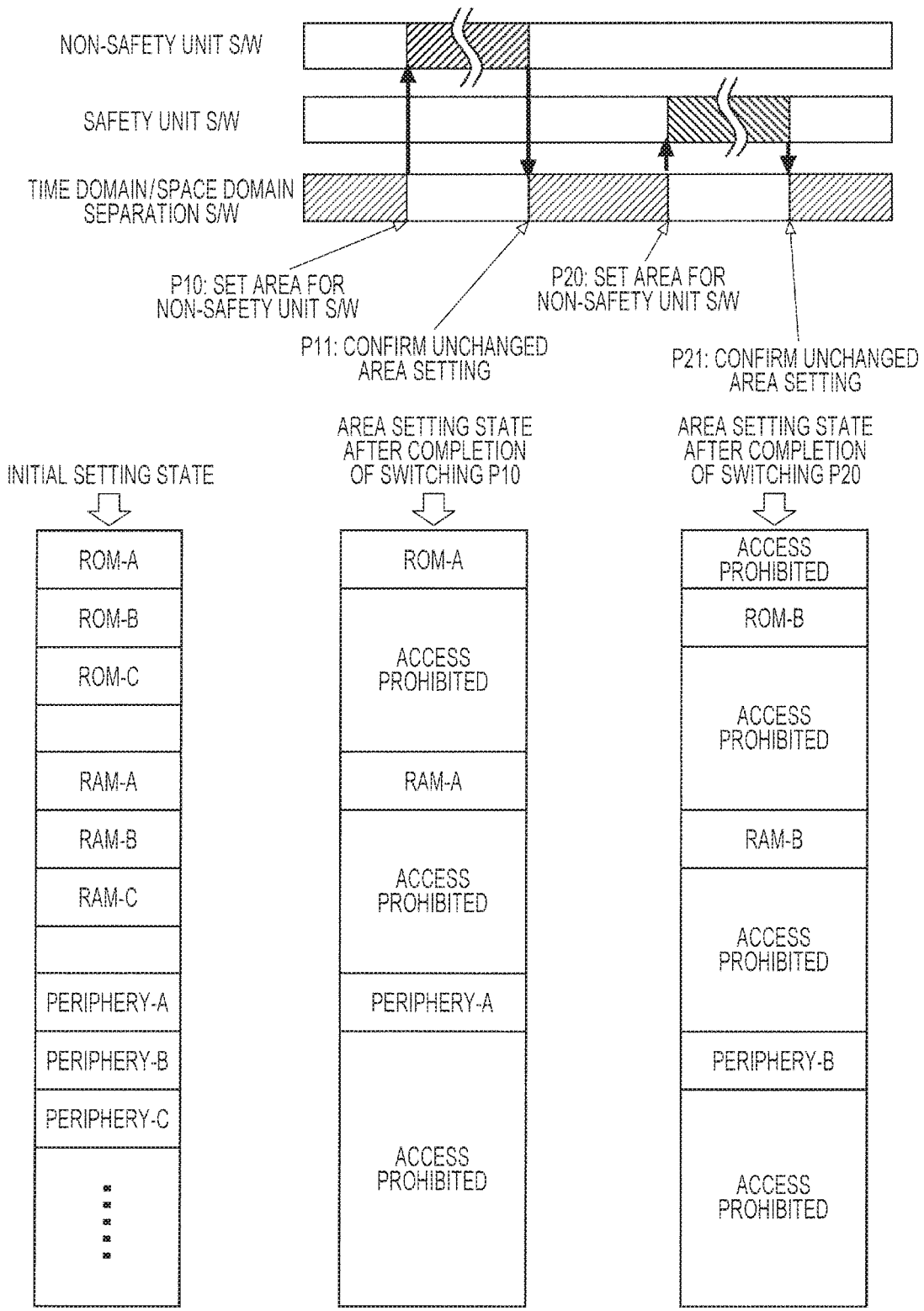
FIG. 6 is a timing chart for explaining the separation of the functional safety system according to the first embodiment.

The separation will be specifically described below. FIG. 6 shows a timing chart for explaining the separation of the functional safety system according to the first embodiment. The upper part of FIG. 6 indicates separation at the time of software switching from the non-safety unit software 11 to software executed by the safety unit software 12. The lower part of FIG. 6 shows a memory space for explaining an accessible range set for the access limiting circuit 42.

As shown in FIG. 6, in the functional safety system 1 according to the first embodiment, an accessible memory space is allocated to each piece of the software (for example, a memory space map in the lower left part of FIG. 6). The time domain and space domain separation software 13 provides the register 42a of the access limiting circuit 42 with the access limit range for the software executed by the arithmetic section 40 after the switching of the software, and then the time domain and space domain separation software 13 starts the processing of the switched software (processing P10, P20). Thereafter, the time domain and space domain separation software 13 performs separation such that the access limit range for the subsequent software is set for the access limiting circuit 42 at the completion of the operation of the software being executed. At this point, the time domain and space domain separation software 13 performs first diagnosis for confirming that the access limit setting of the executed software is unchanged (processing P11, P21). In the functional safety system 1 according to the first embodiment, the first diagnosis ensures that the spatial separation of the hardware resources is not changed.

If an access made to an access prohibited area, the access limiting circuit 42 sets a flag in a predetermined register (e.g., a predetermined register in the register 42a) or causes interruption to the arithmetic section 40. If the time domain and space domain separation software 13 detects the flag set in the register or the arithmetic section 40 detects interruption from the access limiting circuit 42, the arithmetic section 40 executes the safety unit software 12, allowing the first semiconductor chip 10 to perform functional safety processing.

Figure 7:
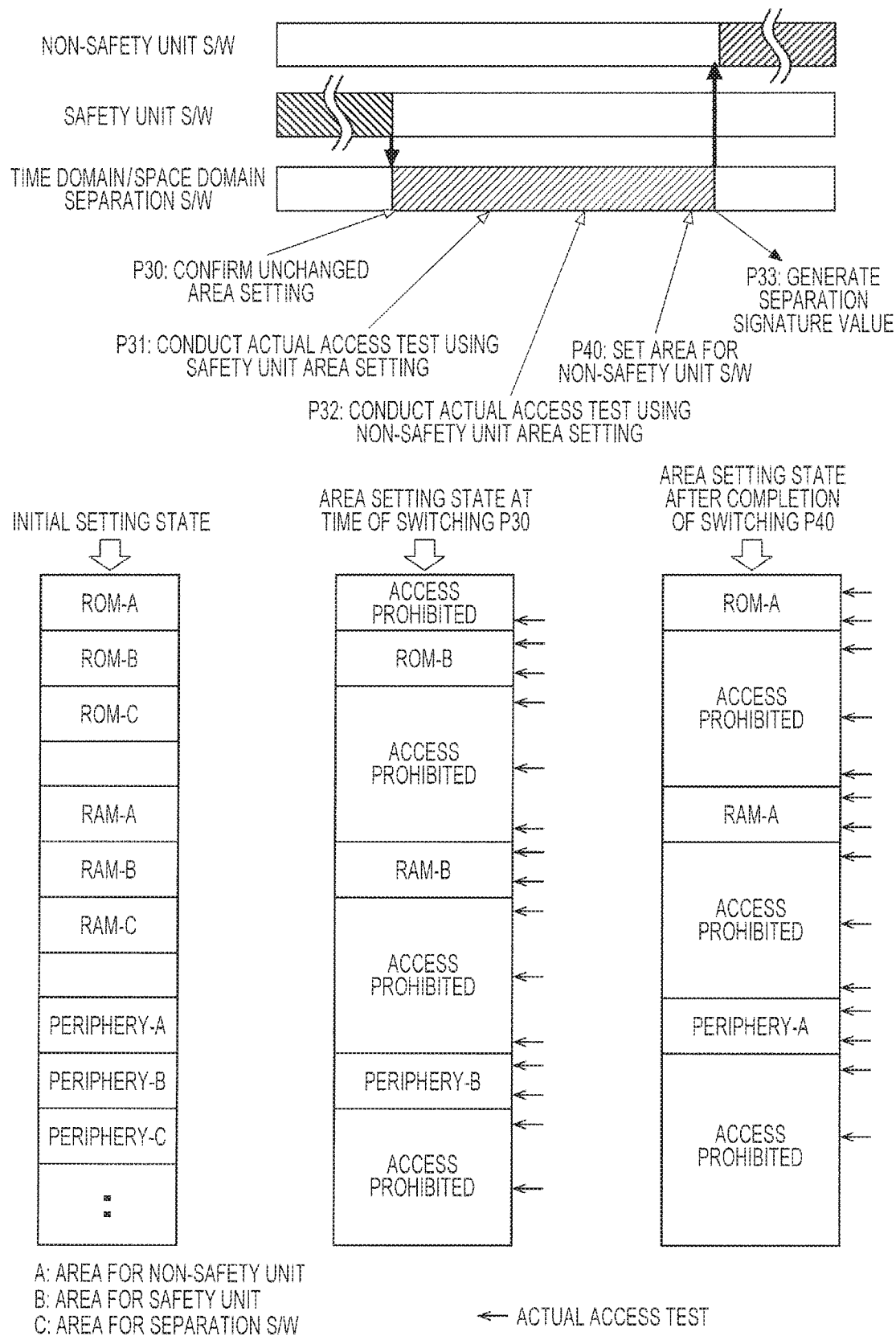
FIG. 7 is a timing chart for specifically explaining the separation of the functional safety system according to the first embodiment.

The functional safety system 1 according to the first embodiment determines whether the access limit range correctly functions during the separation of the time domain and space domain separation software 13. FIG. 7 shows a timing chart for specifically explaining the separation of the functional safety system according to the first embodiment. The timing chart in FIG. 7 shows an enlarged part of the separation.

As shown in FIG. 7, in the separation of the first embodiment, the first diagnosis is performed to confirm that the access limit setting of the software before switching (the safety unit software in the example of FIG. 7) is unchanged (processing P30). The time domain and space domain separation software 13 then performs second diagnosis on an access range where an access limit set value confirmed in the processing P30 is used (processing P31). In the second diagnosis, it is confirmed that an access can be made to an accessible area set based on the access limit set value for the software before switching. Moreover, in the second diagnosis, it is confirmed that an access is denied to the access prohibited area set based on the access limit set value for the software before switching. In the second diagnosis, actual access processing (actual access test in FIG. 7) is performed on both of an access permitted area and the access prohibited area.

Subsequently, in the separation of the first embodiment, the time domain and space domain separation software 13 performs third diagnosis (processing P32) after processing P31. In the third diagnosis, it is confirmed that an access can be made to an accessible area set based on the access limit set value for the software after switching. Moreover, in the third diagnosis, it is confirmed that an access is denied to the access prohibited area set based on the access limit set value for the software after switching. In the third diagnosis, actual access processing (actual access test in FIG. 7) is performed on both of the access permitted area and the access prohibited area.

The actual access test is conducted on an area around a boundary address between the access permitted area and the access prohibited area and an intermediate point between the areas. Moreover, an actual access test on an access range including multiple access ranges of RAM and ROM or the like is conducted in a diagnosis (self-diagnosis) of the safety unit software 12.

In the separation of the first embodiment, the first to third diagnoses are performed as setting correctness diagnosis, and then rewriting is performed to set (or determine) the access limit set value for the software after switching (processing P40). Furthermore, in the separation of the first embodiment, a separation signature value is generated that includes the processing results of the setting correctness diagnosis and the rewriting (processing P33). The separation signature value does not simply indicate the completion of processing but includes processing history information on, for example, the results of processing.

If an error is found in some processing included in the separation of the first embodiment, the time domain and space domain separation software 13 instructs the safety unit software 12 to execute functional safety processing. For the second diagnosis and the third diagnosis in the separation involving the actual access test, the timing of diagnosis, the frequency of diagnosis, and the order of diagnosis may be changed according to the use of the system and the authentication level of functional safety.

Figure 8:
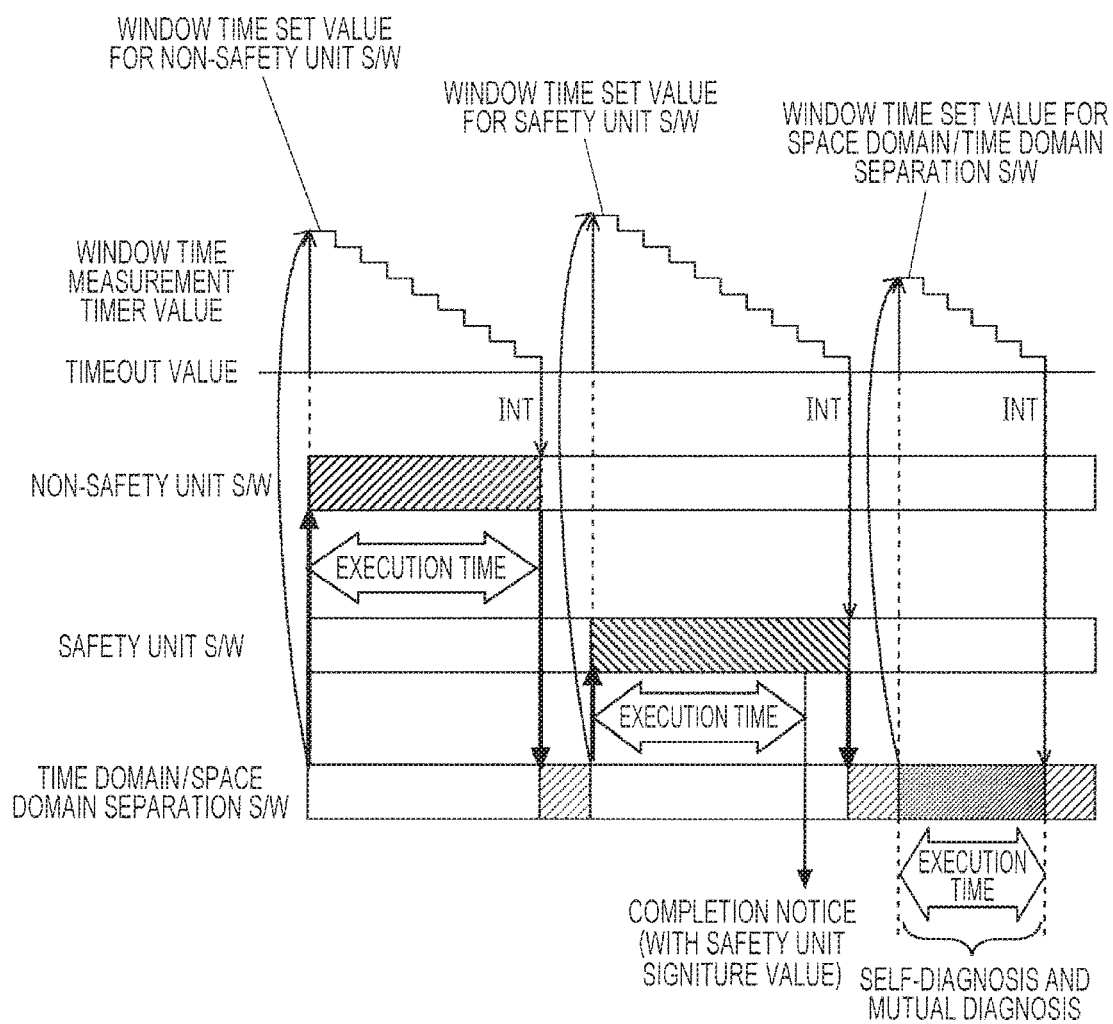
FIG. 8 is a timing chart for explaining the switching time of software in the functional safety system according to the first embodiment.

The switching time of the software of the functional safety system 1 according to the first embodiment will be discussed below. FIG. 8 shows a timing chart for specifically explaining the switching time of the software in the functional safety system according to the first embodiment. As shown in FIG. 8, in the functional safety system 1 according to the first embodiment, the time domain and space domain separation software 13 provides the register 44a of the timer 44 with a window time set value before predetermined software is executed by the arithmetic section 40. The window time set value specifies the limiting value of the execution time of the software to be executed. The timer 44 counts down from a count start value that is a window time value. When the count value reaches preset timeout value (e.g., 0), the timer 44 notifies an interrupt signal INT to the arithmetic section 40. The arithmetic section 40 having received the interrupt signal INT completes the processing of the executed software and performs the separation of the time domain and space domain separation software 13. Specifically, in the first embodiment, the timer 44 counts an elapsed time from the start of execution of the software. When the count value reaches a window time determined for each piece of the software, the software executed by the arithmetic section 40 is switched to the time domain and space domain separation software 13 and the separation is performed by the time domain and space domain separation software 13.

The window set value and the execution time of the software will be discussed below. In the functional safety system 1 according to the first embodiment, the three pieces of software run on the first semiconductor chip 10. Among the three pieces of software, the non-safety unit software 11 is introduced by, for example, a user. The window time set value is determined according to the specification of the non-safety unit software 11. Although the safety unit software 12 is also introduced by a user, the window time set value is set as a time sufficiently longer than the execution time of the safety unit software 12. This is because the safety unit software 12 completes an operation in the set time of the window time set value and notifies the time domain and space domain separation software 13 of the completion. As to the time domain and space domain separation software 13, the window time set value is a time in which self-diagnosis and mutual diagnosis can be completed.

The completion notice will be described below. The completion notice generated by executing the safety unit software 12 includes a safety unit signature value. The safety unit signature value describes the processing history of the safety unit software 12, for example, the order of processing, the processing results, and the processing time of the safety unit software 12. Moreover, the time domain and space domain separation software 13 performs self-diagnosis by diagnosing the presence or absence of reception of the completion notice and the correctness of processing in the safety unit signature value.

Figure 9:
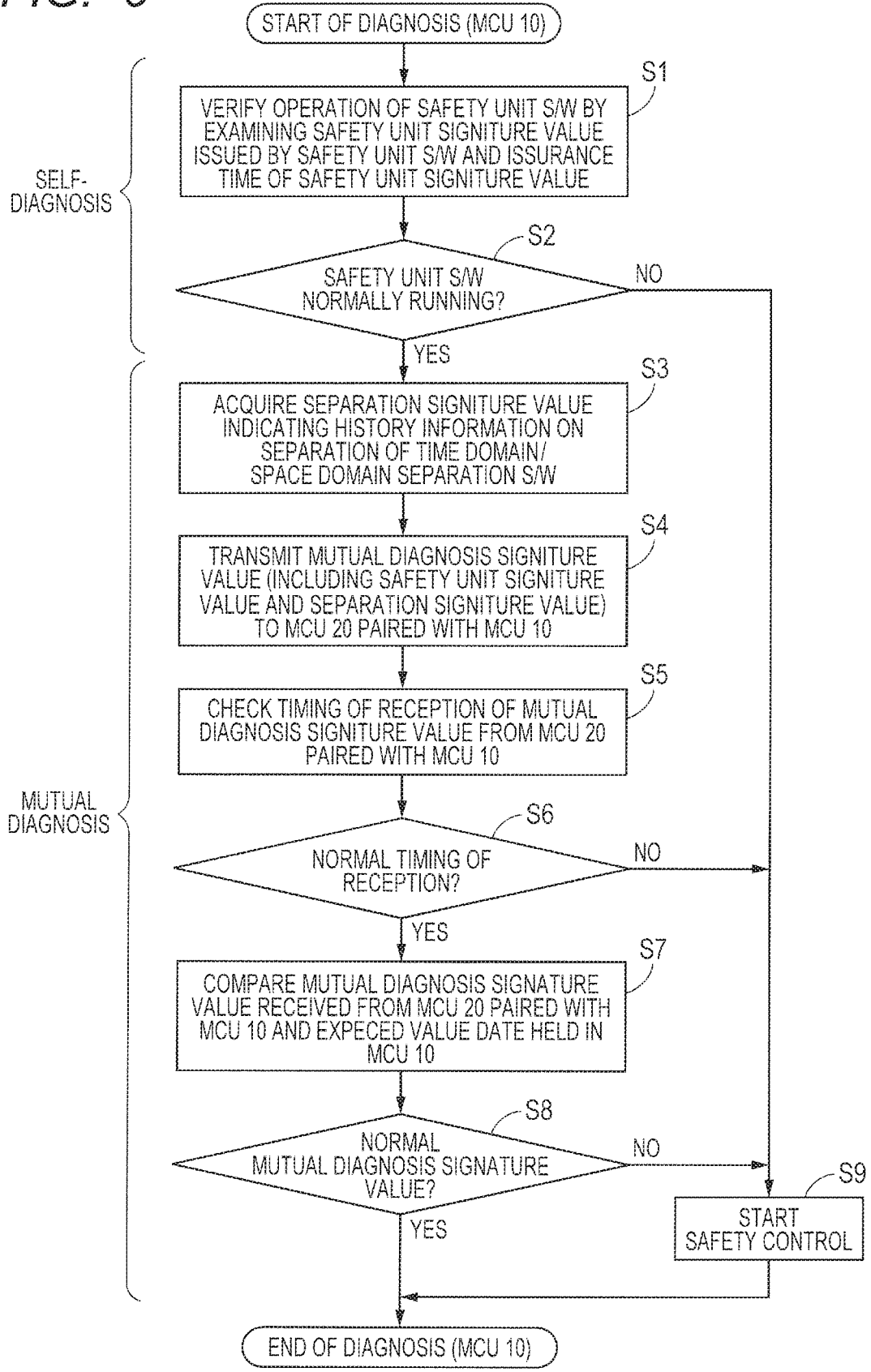
FIG. 9 is a flowchart for explaining the flow of self-diagnosis and mutual diagnosis of the space domain and time domain separation software in the functional safety system according to the first embodiment.

The self-diagnosis and mutual diagnosis by the time domain and space domain separation software 13 will be discussed below. FIG. 9 is a flowchart for explaining the flow of the self-diagnosis and mutual diagnosis of the time domain and space domain separation software in the functional safety system according to the first embodiment.

As shown in FIG. 9, at the start of diagnosis, the time domain and space domain separation software 13 verifies the operation of the safety unit software 12 by examining the safety unit signature value issued by the safety unit software 12 and the issuance time of the safety unit signature value (step S1). In the examination of step S1, an expected value preset for the safety unit signature value and the issuance time is compared with the safety unit signature value generated by the safety unit software 12. If a large difference is not found between the expected value and the safety unit signature value, it is determined that the safety unit software 12 runs correctly. In other words, in the self-diagnosis of the time domain and space domain separation software 13, the operation of the safety unit software is examined using both of the safety unit signature value and the issuance time indicating the timing of issuance of the safety unit signature value.

If it is determined that the safety unit software 12 runs correctly as a result of the examination of step S1, the time domain and space domain separation software 13 causes the safety unit software 12 to make a mutual diagnosis (YES at step S2). If it is determined that an abnormality occurs in the safety unit software 12 as a result of examination in step S1, the time domain and space domain separation software 13 instructs the safety unit software 12 to start safety control (NO at step S2, step S9).

In mutual diagnosis, the time domain and space domain separation software 13 first acquires a separation signature value indicating history information on the separation performed by the time domain and space domain separation software 13 (step S3). The separation signature value is stored in, for example RAM accessible by the time domain and space domain separation software 13. The time domain and space domain separation software 13 generates a mutual diagnosis signature value including the separation signature value acquired in step S3 and the safety unit signature value confirmed in step S1, and transmits the generated mutual diagnosis signature value to the second semiconductor chip 20 paired with the first semiconductor chip 10 (step S4).

Subsequently, the time domain and space domain separation software 13 checks the timing of reception of the mutual diagnosis signature value from the second semiconductor chip 20 paired with the first semiconductor chip 10 (step S5). The first semiconductor chip 10 holds the mutual diagnosis signature value in a predetermined storage area with information on the timing of reception, the mutual diagnosis signature value being transmitted by the second semiconductor chip 20 at a time independently from the first semiconductor chip 10. If the timing of reception of the mutual diagnosis signature value from the second semiconductor chip 20 falls within an expected range, the time domain and space domain separation software 13 determines that the timing of reception is normal. The time domain and space domain separation software 13 makes a diagnosis of the correctness of the mutual diagnosis signature value received from the second semiconductor chip 20 (YES at step S6). If the timing of reception of the mutual diagnosis signature value from the second semiconductor chip 20 falls outside the expected range, the time domain and space domain separation software 13 determines that the timing of reception is abnormal (NO at step S6). If it is determined that the timing of reception is abnormal, the time domain and space domain separation software 13 instructs the safety unit software 12 to start safety control (step S9).

In step S6, if it is determined that the timing of reception of the mutual diagnosis signature value is normal, the time domain and space domain separation software 13 compares the mutual diagnosis signature value received from the second semiconductor chip 20 and expected value data stored in the first semiconductor chip 10 (step S7). If the mutual diagnosis signature value received from the second semiconductor chip 20 is different from the expected value data, the time domain and space domain separation software 13 determines that the second semiconductor chip 20 has an abnormality, and instructs the safety unit software 12 to start safety control (step S9).

If the mutual diagnosis signature value received from the second semiconductor chip 20 is equal to the expected value data, the time domain and space domain separation software 13 determines that the second semiconductor chip 20 has operated normally, and then completes the processing (YES at step S8).

In the functional safety system 1 according to the first embodiment, the mutual diagnosis of the time domain and space domain separation software 13 and 23 compensates for the operations of the time domain and space domain separation software 13 and 23.

Figure 11:
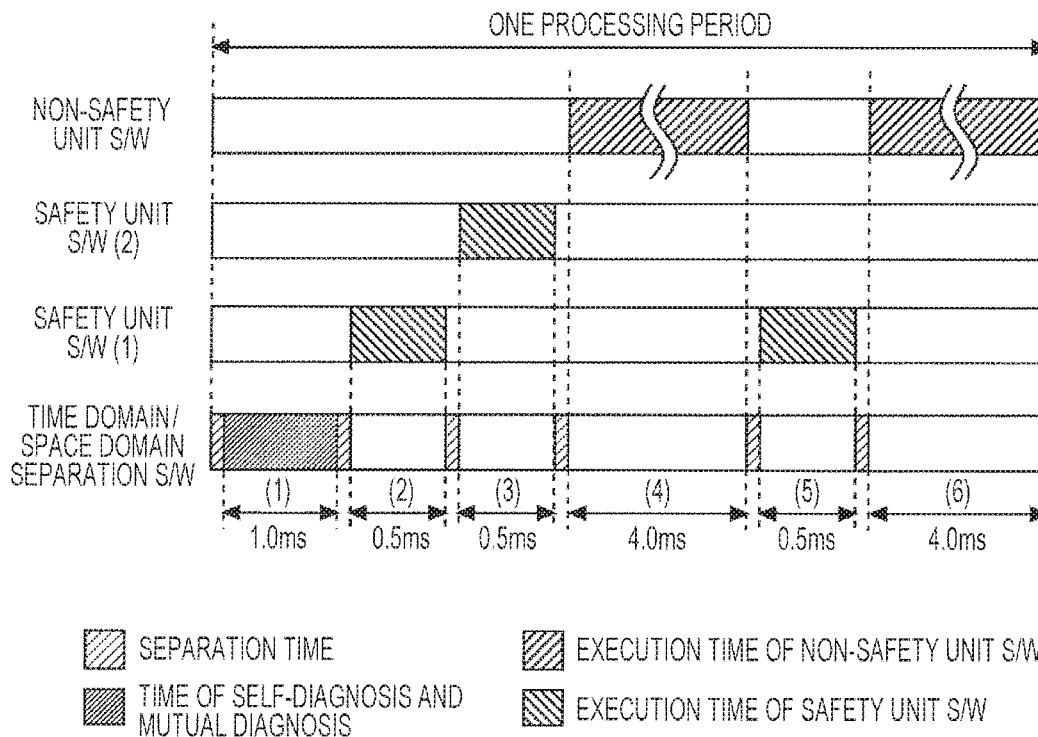
FIG. 11 is a table for explaining a second example of an operation set value provided for the functional safety system according to the first embodiment.
Figure 12:
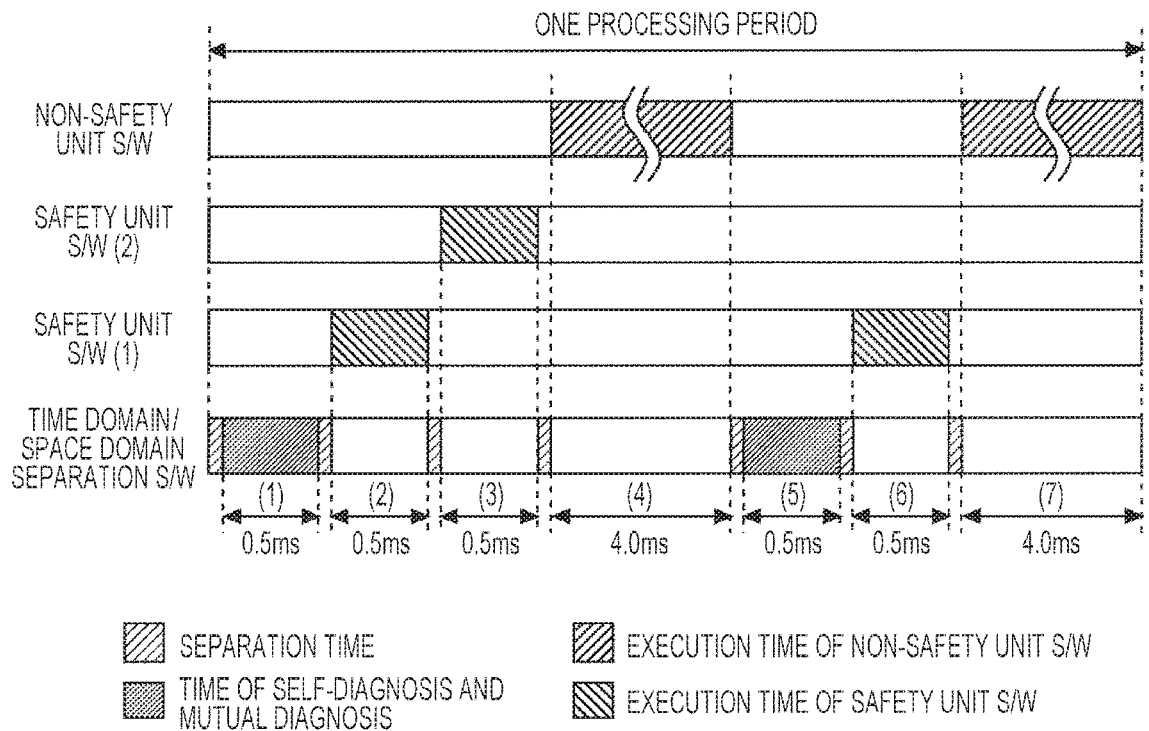
FIG. 12 is a table for explaining a third example of an operation set value provided for the functional safety system according to the first embodiment.

Operation set values for setting the execution time and execution order of the software in the functional safety system 1 according to the first embodiment will be discussed below. FIGS. 10 to 12 show tables for explaining first to third examples of the operation set values for the functional safety system according to the first embodiment. In FIGS. 10 to 12, the upper part indicates the table of exemplary operation set values and the lower part indicates a timing chart of the operation of the semiconductor chip according to the operation set values shown in the upper part.

The operation set values are described in a file in a predetermined format and are provided for the first semiconductor chip 10 and the second semiconductor chip 20. Subsequently, the time domain and space domain separation software 13 of the first semiconductor chip 10 and the time domain and space domain separation software 23 of the second semiconductor chip 20 read the provided operation set values, and then the arithmetic sections 40 execute the software with settings described in the operation set values.

As shown in FIGS. 10 to 12, a window time, an execution order, and the address ranges of hardware resources where access is permitted are described at the operation set values for each piece of the software. Moreover, the length of the fundamental period is described in the operation set value for the time domain and space domain separation software.

The first example of FIG. 10 indicates the operation set values for executing the non-safety unit software 11, the safety unit software 12, and the time domain and space domain separation software 13 on the first semiconductor chip 10. In the first example of FIG. 10, the time domain and space domain separation software 13 is executed first, the safety unit software 12 is executed second and fourth, and the non-safety unit software 11 is executed third and fifth.

The second example of FIG. 11 indicates the operation set values for executing the non-safety unit software 11, two pieces of the safety unit software 12, and the time domain and space domain separation software 13 on the first semiconductor chip 10. In this example, the two pieces of the safety unit software 12 perform functional safety control with different functions. In the second example of FIG. 11, the time domain and space domain separation software 13 is executed first, the first safety unit software 12 is executed second and fifth, the second safety unit software 12 is executed third, and the non-safety unit software 11 is executed fourth and sixth. If the total execution time of the software falls within the fundamental period, multiple pieces of the same software can be installed as shown in FIG. 11.

In the third example of FIG. 12, the non-safety unit software 11, two pieces of the safety unit software 12, and the time domain and space domain separation software 13 are executed on the first semiconductor chip 10. In the third example, the time domain and space domain separation software 13 is executed in two time periods. The third example indicates that the execution time of the software may be divided into different time periods.

If the total window time of the software exceeds a time set as the fundamental period, the first semiconductor chip 10 and the second semiconductor chip 20 are set so as not to operate. This setting is made to prevent a malfunction caused by an erroneous setting of the execution state of the software. The fundamental period does not include the non-separation time of the time domain and space domain separation software 13.

The operations of the functional safety system 1 with interruption according to the first embodiment will be discussed below. In the functional safety system 1 according to the first embodiment, the interrupt signal can be received unless the time domain and space domain separation software 13 is executed. However, the interruption time is particularly significant in the execution time of the safety unit software 12 in the functional safety system 1 according to the first embodiment. If interruption occurs during the execution of the safety unit software 12, the time domain and space domain separation software 13 determines that the safety unit software 12 has an abnormality, and performs functional safety processing unless the operation of the safety unit software 12 is completed in the window time set for the safety unit software 12.

In the case of interruption in the functional safety system 1 according to the first embodiment, if the arithmetic section 1 receives an interrupt request of the processing of one of the non-safety unit software, which does not perform functional safety control, and the safety unit software, first separation and second separation are performed by space domain and time domain separation software. In the first separation, the access limiting state of the access limiting circuit 42 is set based on an interrupt access-limit set value prepared for the interrupt of the software having issued the interrupt request. In the second separation, the set value of the access limiting 42 at the completion of the interrupt is rewritten to the access limit set value for the software executed in the arithmetic section before the issuance of an interrupt request, and then the software executed in the arithmetic section is returned to the software executed in the arithmetic section before the issuance of the interrupt request. This operation will be specifically described below.

Figure 13:
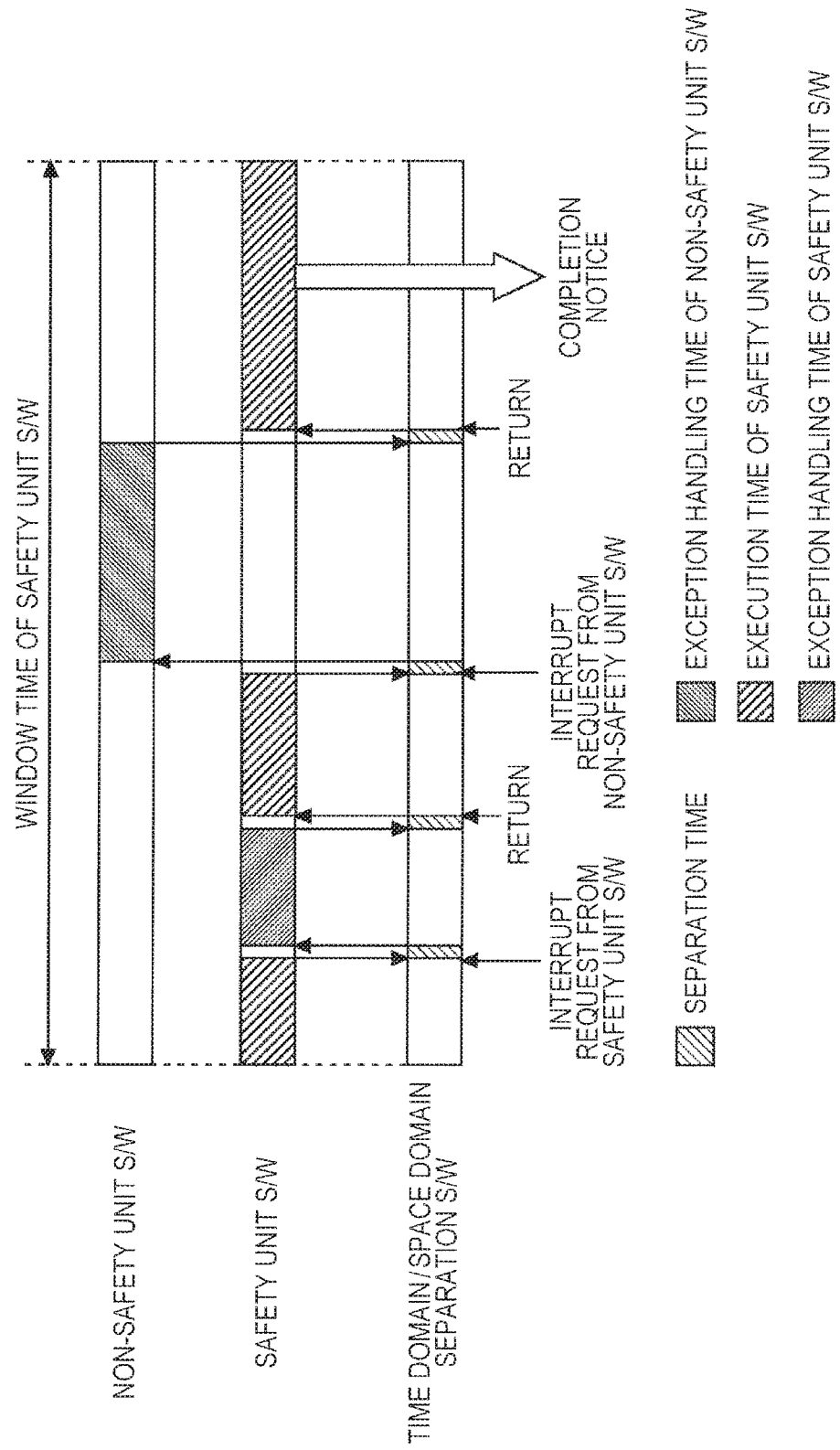
FIG. 13 is a timing chart for explaining an operation performed when an interrupt occurs in the functional safety system according to the first embodiment.

FIG. 13 shows a timing chart for explaining an operation performed when an interrupt occurs in the functional safety system according to the first embodiment. As shown in FIG. 13, in the functional safety system 1 according to the first embodiment, the time domain and space domain separation software 13 performs separation in response to the interrupt request from the safety unit software 12 such that the access limit set value, which is set for the safety unit software 12, in the access limit circuit 42 is rewritten to an access limit set value prepared for the interrupt of the safety unit software 12. Then, the arithmetic section 40 performs an interrupt requested from the safety unit software 12 after the separation. At the completion of the interrupt for the safety unit software 12 in the arithmetic section 40, the time domain and space domain separation software 13 performs separation such that the access limit set value for the interrupt of the safety unit software 12 is rewritten to a normal access limit set value for the safety unit software 12. After the access limit set value is returned to the set value for the safety unit software 12, the arithmetic section 40 executes the safety unit software 12 again.

In the case of an interrupt request for the non-safety unit software 11 during the execution period of the safety unit software 12, the time domain and space domain separation software 13 performs separation such that the access limit set value, which is set for the safety unit software 12, in the access limit circuit 42 is rewritten to an access limit set value prepared for the interrupt of the non-safety unit software 11. Then, the arithmetic section 40 performs an interrupt requested from the non-safety unit software 11 after the separation. At the completion of the interrupt for the non-safety unit 11 in the arithmetic section 40, the time domain and space domain separation software 13 performs separation such that the access limit set value for the interrupt of the non-safety unit software 11 is rewritten to a normal access limit set value for the safety unit software 12.

After the access limit set value is returned to the set value for the safety unit software 12, the arithmetic section 40 executes the safety unit software 12 again.

In the separation in response to the interrupt request, only the first diagnosis P30 and the rewriting P40 in FIG. 7 may be performed or the second diagnosis P31 and the third diagnosis P32 may be performed in addition to the first diagnosis P30 and the rewriting P40.

As described above, in the functional safety system 1 according to the first embodiment, at least the safety unit software and the time domain and space domain separation software are executed on the first semiconductor chip 10 and the second semiconductor chip 20.

Furthermore, in the functional safety system 1 according to the first embodiment, the time domain and space domain separation software is executed on each of the semiconductor chips, thereby executing the non-safety unit software at a different time and in a different space (for example, the range of used hardware resources) from the safety unit software.

Furthermore, the time domain and space domain separation software makes a self-diagnosis in which whether the operation of the safety unit software is correctly performed is verified by examining the safety unit signature value describing the operation history of the safety unit software. Thus, the functional safety system 1 according to the first embodiment ensures the correctness of the operation of the safety unit software.

Moreover, the functional safety system according to the first embodiment make a mutual diagnosis in which mutual diagnosis signature values indicating the operation history of the time domain and space domain separation software are transmitted and received between the first semiconductor chip 10 and the second semiconductor chip 20 so as to mutually verify the mutual diagnosis signature values generated by the semiconductor chips. In the functional safety system 1 according to the first embodiment, the mutual diagnosis ensures the correctness of the operation of the time domain and space domain separation software for diagnosis of the correctness of the operation of the safety unit software. For example, in the functional safety system 1 according to the first embodiment, the time domain and space domain separation software 23 installed on the second semiconductor chip 20 can detect a failure of the safety unit software 12 and the time domain and space domain separation software 13 and perform functional safety processing using the safety unit software 22.

The first semiconductor chip 10 and the second semiconductor chip 20 operate based on independent clock signals, thereby ensuring the correctness of the mutual diagnosis without mutually interfering with the operations.

Furthermore, in the functional safety system 1 according to the first embodiment, the separation can prevent operation interference between the safety unit software and the non-safety unit software executed on the same semiconductor chip as the safety unit software. Thus, for example, even in the case of a modification for improving the function of the non-safety unit software, additional functional safety authentication is not necessary, leading to greater flexibility in the modification of the non-safety unit software.

Moreover, in the functional safety system 1 according to the first embodiment, the safety unit software and the non-safety unit software executed on the same semiconductor chip can mutually ensure independence. With this configuration, the number of components can be reduced in the functional safety system 1 having a multilevel configuration for functional safety according to the first embodiment.

For an explanation of the effect of reducing the number of components, FIG. 14 shows a block diagram for explaining a system configuration example of the functional safety system according to the first embodiment. In FIG. 14, the upper part illustrates a non-safety system having no functional safety configuration, the medium part illustrates a dual safety system as a comparative example, and the lower part illustrates the dual safety system according to the first embodiment.

As shown in FIG. 14, in the simple application of the functional safety system to the non-safety system, non-safety unit software executed in a system control MCU 100 cannot be freely modified unless two functional safety control MCUs are used to guarantee the functional safety of the system control MCU 100. However, by using the first semiconductor chip 10 and the second semiconductor chip 20 according to the first embodiment, flexibility in the modification of the non-safety unit software is not lost even if the non-safety unit software and the safety unit software are installed on one of the semiconductor chips. In other words, by using the first semiconductor chip 10 and the second semiconductor chip 20 with the time domain and space domain separation software according to the first embodiment, the flexibility in the modification of the non-safety unit software can be ensured while achieving functional safety with a small number of chips.

Second Embodiment

A second embodiment will describe another aspect of the operations of the time domain and space domain separation software 13 and 23 according to the first embodiment. In the explanation of the second embodiment, the same constituent elements as those of the first embodiment are indicated by the same reference numerals as those of the first embodiment and the explanation thereof is omitted.

In a functional safety system according to the second embodiment, safety unit software includes pieces of safety unit software. In time domain and space domain separation software 13 and 23 according to the second embodiment, separation is used in the switching of the pieces of the safety unit software, preventing interference between the ranges of use of hardware resources used by the pieces of the safety unit software.

Figure 15:
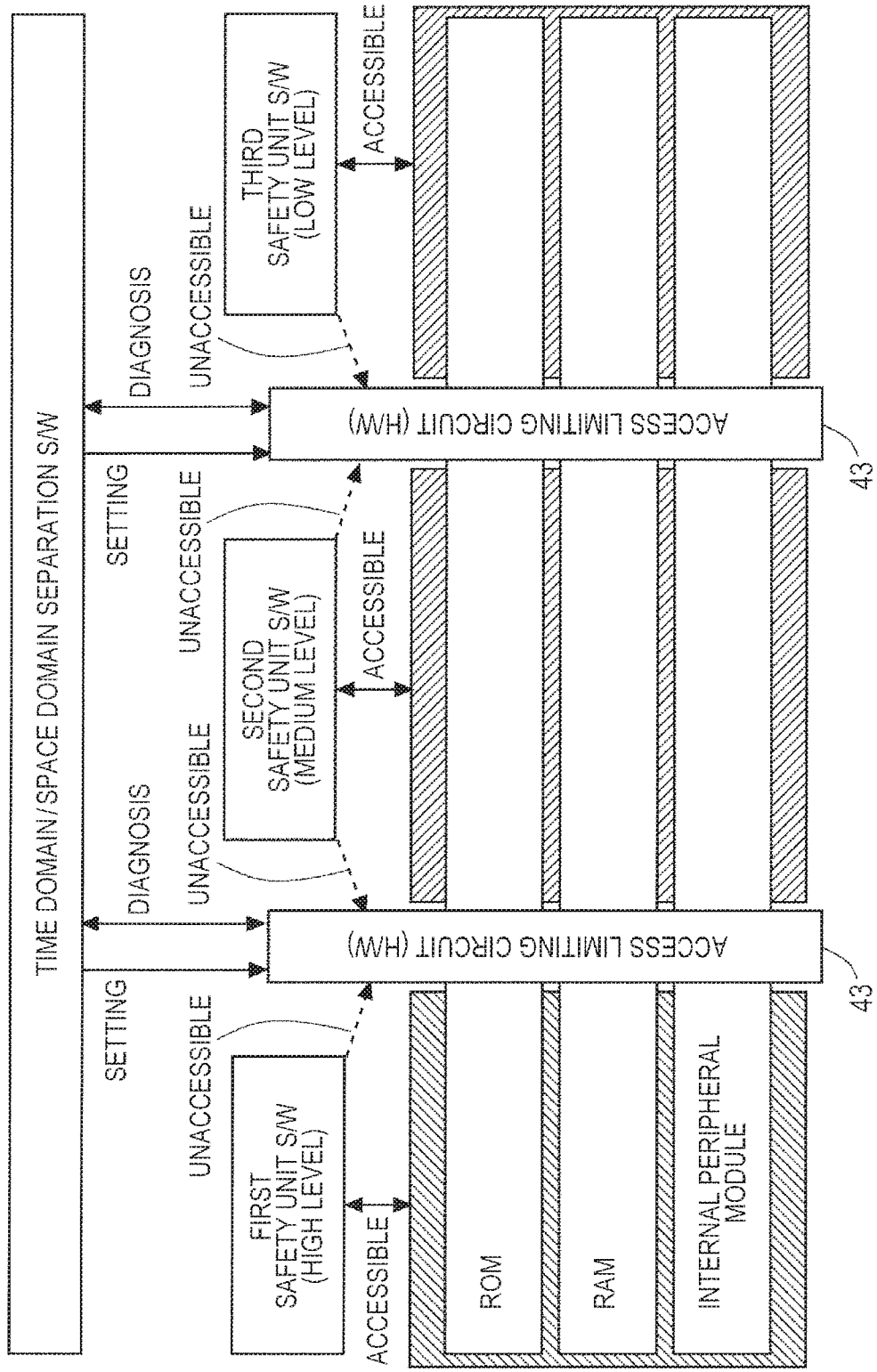
FIG. 15 is a block diagram for explaining the state of space domain separation in a functional safety system according to a second embodiment.

FIG. 15 shows a block diagram for explaining the state of space domain separation in the functional safety system according to the second embodiment. As shown in FIG. 15, in the functional safety system according to the second embodiment, different access limit set values are set for respective pieces of software in an access limiting circuit 42, preventing interference between the hardware resources of the pieces of safety unit software. In the example of FIG. 15, the safety unit software includes first safety unit software, second safety unit software, and third safety unit software. The first safety unit software is set at the highest safety level, the second safety unit software is set at the intermediate safety level, and the third safety unit software is set at the lowest safety level. In other words, the first to third safety unit software vary in verification level and design. In order to secure the safety levels of the safety unit software, it is necessary to separate the time domain and the space domain. The time domain and space domain separation software 13 and 23 according to the second embodiment separates the execution time and the execution space of the third safety unit software from the first safety unit software.

Figure 16:
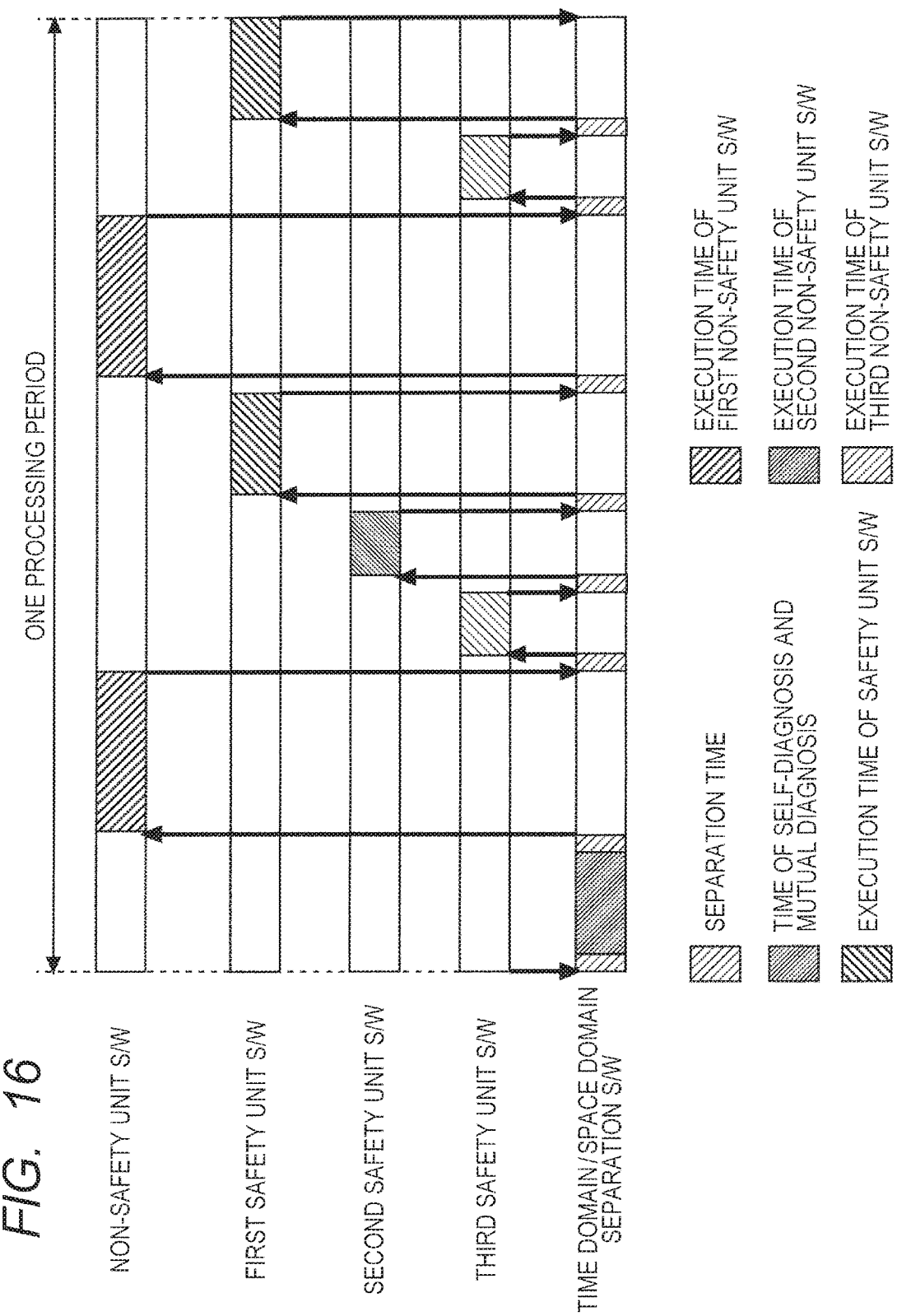
FIG. 16 is a timing chart for explaining the operation of the functional safety system according to the second embodiment.

FIG. 16 shows a timing chart for explaining the operation of the functional safety system according to the second embodiment. As shown in FIG. 16, the software executed by an arithmetic section 40 through the separation of the time domain and space domain separation software is switched also in the second embodiment. In the second embodiment, the first to third safety unit software is executed in different time periods, leading to separated time domains.

As described above, in the functional safety system according to the second embodiment, the pieces of safety unit software are executed in the separated time domains and space domains, so that the safety unit software at different safety levels can be executed with the separated time domains and space domains on a single semiconductor chip. Thus, the functional safety system according to the second embodiment can increase the flexibility of the safety unit software to be installed.

Third Embodiment

A third embodiment will describe another aspect of the operations of the time domain and space domain separation software 13 and 23 according to the second embodiment. In the explanation of the third embodiment, the same constituent elements as those of the first and second embodiments are indicated by the same reference numerals as those of the first embodiment and the explanation thereof is omitted.

In a functional safety system according to the third embodiment, safety unit software includes pieces of safety unit software as in the second embodiment but some of the pieces of the software have not been installed. Also in time domain and space domain separation software 13 and 23 according to the third embodiment, separation is used in the switching of the pieces of the safety unit software, preventing interference between the ranges of use of hardware resources used by the pieces of the safety unit software.

Figure 17:
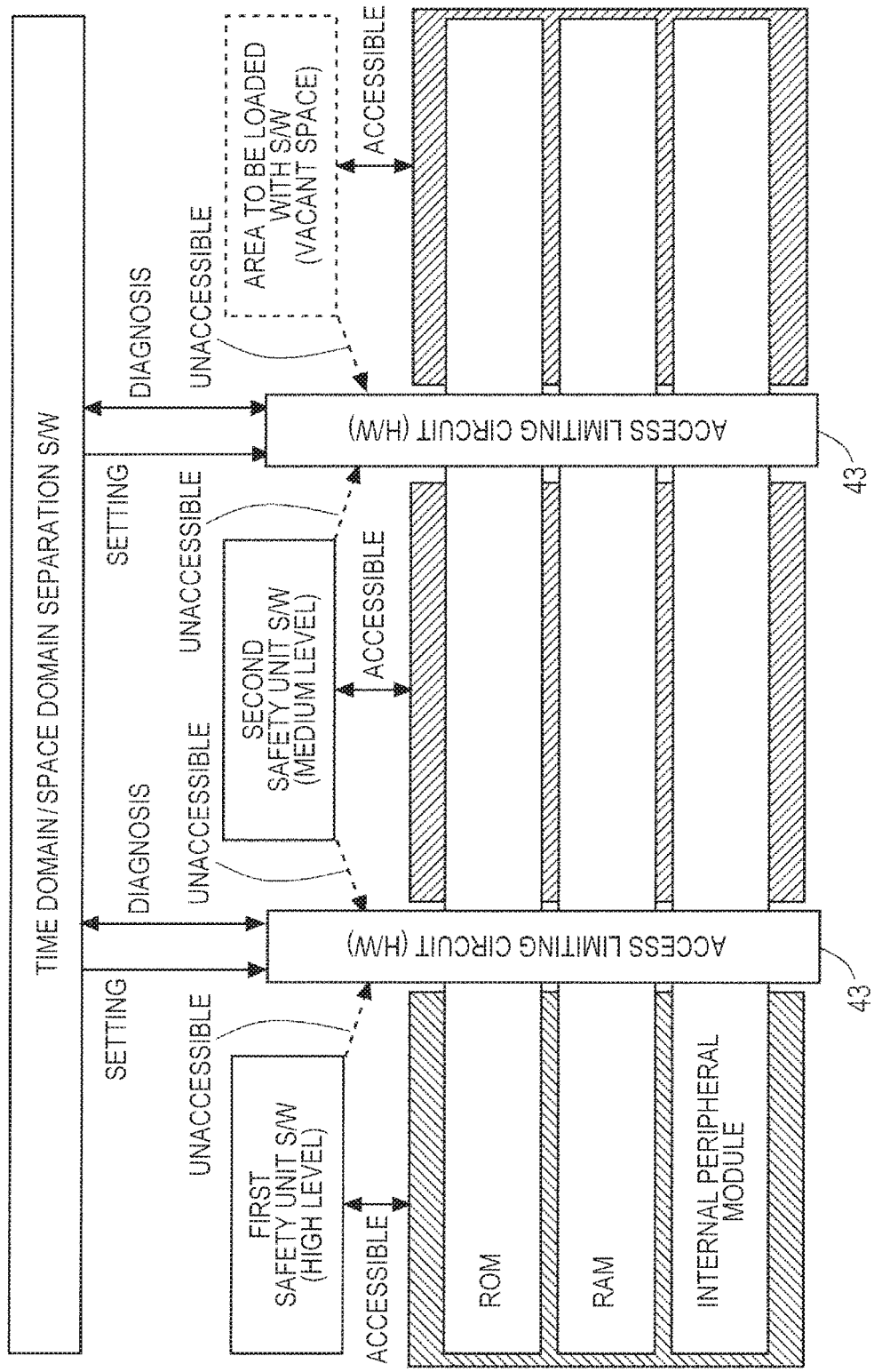
FIG. 17 is a block diagram for explaining the state of space domain separation in a functional safety system according to a third embodiment.

FIG. 17 shows a block diagram for explaining the state of space domain separation in the functional safety system according to the third embodiment. As shown in FIG. 17, in the functional safety system according to the third embodiment, the third safety unit software in FIG. 15 has not been installed. A software installation area is apart defined as a time domain and a space domain where the third safety unit software is to be installed. For example, an operation set value for the time domain and space domain separation software includes information on an execution time and an execution order in apart where software has not been decided yet, enabling space domain separation as in FIG. 17.

Figure 18:
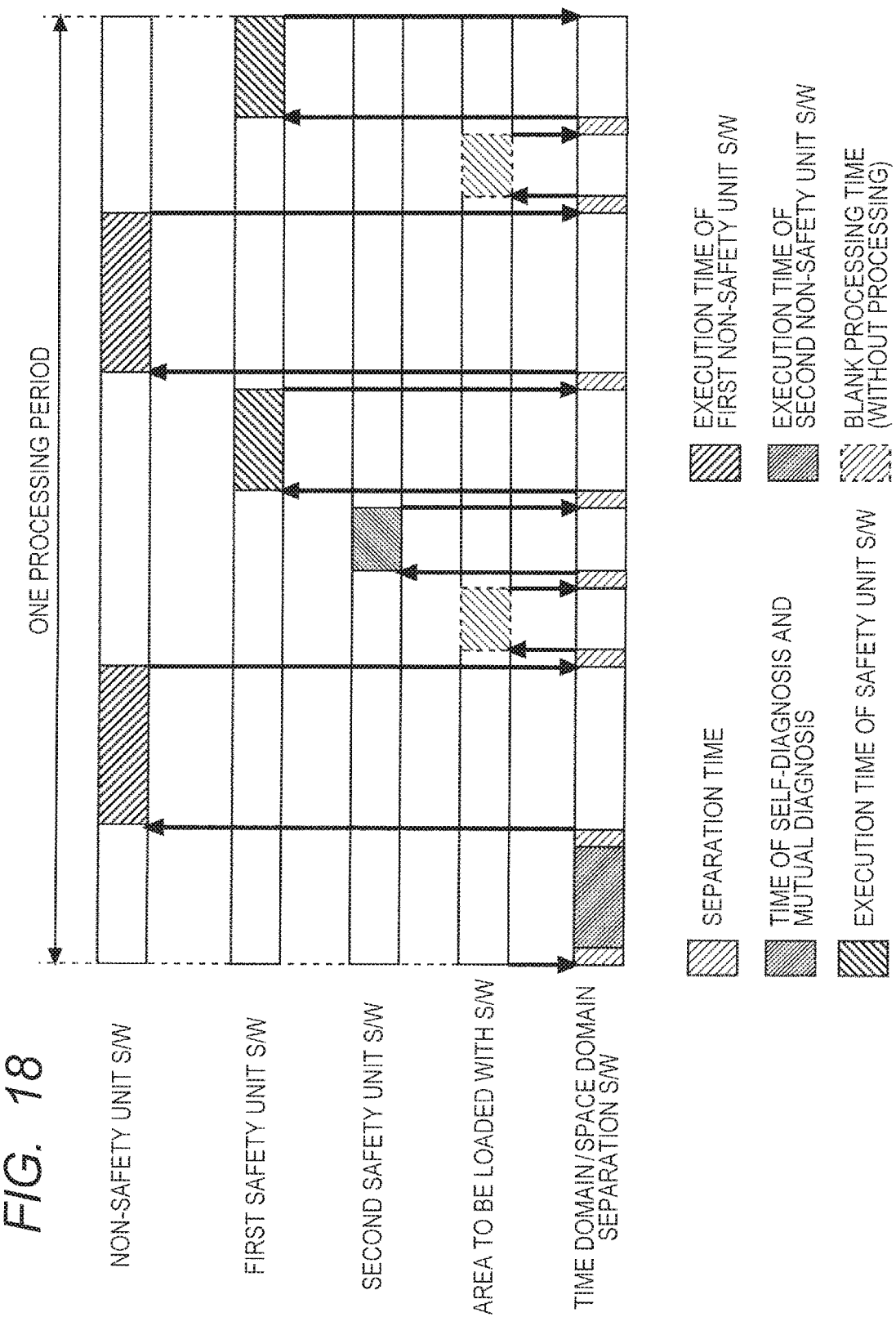
FIG. 18 is a timing chart for explaining the operation of the functional safety system according to the third embodiment.

FIG. 18 shows a timing chart for explaining the operation of the functional safety system according to the third embodiment. As shown in FIG. 18, in the third embodiment, a time is set in which processing is not performed on a part corresponding to the software installation area. Such time domain separation is implemented by the operation set value for the time domain and space domain separation software, the operation set value including information on the execution time and the execution order in the part where software has not been decided yet.

As described above, in the functional safety system according to the third embodiment, the software installation area is defined by the description of the operation set value. Thus, the functional safety system according to the third embodiment enables operation verification of completed pieces of the software before the completion of all the pieces of the safety unit software. Moreover, the provision of the software installation area eliminates the need for authentication of the installed safety unit software and allows installation of additional safety unit software.

The invention made by the present inventors was specifically described in accordance with the foregoing embodiments. Obviously, the present invention is not limited to the embodiments and various changes can be made within the scope of the invention.

What is claimed is:

1. A functional safety system comprising:
a first semiconductor chip configured to perform functional control for controlling a circuit to be controlled and functional safety control for safety control on the functional control; and
a second semiconductor chip configured to perform at least the functional safety control on the functional control,
wherein the first semiconductor chip and the second semiconductor chip each includes:
an arithmetic section that executes pieces of software in a timesharing manner;
a plurality of hardware resources used by the software executed in the arithmetic section; and
space domain separation hardware that limits access to a range of the hardware resources accessible by each piece of the software,
wherein in each of the first semiconductor chip and the second semiconductor chip, safety unit software for the functional safety control and space domain and time domain separation software for separation and mutual diagnosis are executed such that the execution is switched between the execution of the safety unit software and the execution of the space domain and time domain separation software,
wherein in the separation, for each piece of the software executed by the arithmetic section:
a setting correctness diagnosis is performed to diagnose correctness of an access limit set value that is a set value of an access limit imposed by the space domain separation hardware is executed;
the access limit set value is rewritten in response to an issuance of an interrupt request of processing of one of the safety unit software and non-safety unit software, wherein the non-safety unit software does not perform functional safety control; and
a separation signature value indicating operation history information on the setting correctness diagnosis and the rewriting is generated, and
wherein in the mutual diagnosis, mutual diagnosis signature values including the separation signature value of the semiconductor chip are generated, the first semiconductor chip and the second semiconductor chip transmit and receive the mutual diagnosis signature values to and from each other, and correctness of the mutual diagnosis signature value received from the other is diagnosed.

2. The functional safety system according to claim 1,
wherein the space domain and time domain separation software perform self-diagnosis processing,
wherein in the self-diagnosis, whether the safety unit software has normally run is diagnosed based on a safety unit signature value that describes operation history information on the safety unit software, the information being generated by the safety unit software, and
wherein the mutual diagnosis signature value includes the safety unit signature value.

3. The functional safety system according to claim 2,
wherein the first semiconductor chip and the second semiconductor chip each includes a timer that counts an execution time for each piece of the software in the arithmetic section, and
wherein the safety unit software and the space domain and time domain separation software are executed while being switched in a predetermined cycle based on a count result of the timer on the semiconductor chip.

4. The functional safety system according to claim 3,
wherein the arithmetic section of the first semiconductor chip executes non-safety unit software that does not perform the functional safety control in addition to the safety unit software and the space domain and time domain separation software, and the safety unit software, the space domain and time domain separation software, and the non-safety unit software are executed while being switched according to a count value of the timer.

5. The functional safety system according to claim 2,
wherein in the self-diagnosis of the space domain and time domain separation software, an operation of the safety unit software is examined using both of the safety unit signature value and an issuance time indicating timing of issuance of the safety unit signature value.

6. The functional safety system according to claim 3,
wherein in the mutual diagnosis of the space domain and time domain separation software, timing of reception of the mutual diagnosis signature value from the other semiconductor chip is acquired based on a time generated by the timer of the semiconductor chip, and correctness of the timing of reception is diagnosed.

7. The functional safety system according to claim 3,
wherein the timer counts an elapsed time from start of execution of the software, and when the count value reaches a window time determined for each piece of the software, the arithmetic section forcibly switches the software executed by the arithmetic section to the time domain and space domain separation software and performs the separation using the time domain and space domain separation software.

8. The functional safety system according to claim 1,
wherein in the setting correctness diagnosis, first diagnosis is performed to confirm that a first access limit set value is unchanged, the first access limit set value being an access limit set value of the space domain separation hardware set for first software executed by the arithmetic section before the software executed by the arithmetic section is switched.

9. The functional safety system according to claim 8,
wherein in the setting correctness diagnosis, second diagnosis is performed to confirm accessibility to an accessible area set based on the first access limit set value and denied access to an access prohibited area set based on the first access limit set value, and wherein third diagnosis is performed to confirm accessibility to an accessible area set based on a second access limit set value that is an access limit set value of the space domain separation hardware set for second software executed in the arithmetic section after the software executed by the arithmetic section is switched, and denied access to an access prohibited area set based on the second access limit set value.

10. The functional safety system according to claim 1, wherein if the arithmetic section receives the interrupt request of processing of one of the non-safety unit software and the safety unit software, the arithmetic section performs first separation and second separation by the space domain and time domain separation software,
wherein in the first separation, an access limiting state of the space domain separation hardware is set based on an interrupt access-limit set value prepared for an interrupt of the software having issued the interrupt request, and
wherein in the second separation, a set value of the space domain separation hardware at completion of the interrupt is rewritten to the access limit set value for the software executed in the arithmetic section before the issuance of the interrupt request, and then the software executed in the arithmetic section is returned to the software executed in the arithmetic section before the issuance of the interrupt request.

11. The functional safety system according to claim 1, wherein for each piece of software executed in the arithmetic section based on an operation set value provided from outside, the space domain and time domain separation software determines an execution time of the software, a fundamental period indicating a length of a repeating period of switching the software, and an execution order of the software in the fundamental period.

12. The functional safety system according to claim 11, wherein the operation set value including information on the execution time and the execution order when software has not been decided yet.

13. The functional safety system according to claim 1, wherein the safety unit software includes pieces of safety unit software, and wherein in time domain and space domain separation software, the separation is used in switching of the pieces of the safety unit software so as to prevent interference between ranges of use of the hardware resources used by the pieces of the safety unit software.

14. The functional safety system according to claim 2, wherein in the first semiconductor chip and the second semiconductor chip, if occurrence of a failure is determined in any one of the separation, the self-diagnosis, and the mutual diagnosis, the safety unit software performs functional safety control for stopping the circuit to be controlled.

15. A safety control method of a functional safety system, the system comprising:
a first semiconductor chip configured to perform functional control for controlling a circuit to be controlled and functional safety control for safety control on the functional control; and
a second semiconductor chip configured to perform at least the functional safety control on the functional control,
the first semiconductor chip and the second semiconductor chip each including:
an arithmetic section that executes pieces of software in a timesharing manner;
a plurality of hardware resources used by the software executed in the arithmetic section;
space domain separation hardware that limits access to the hardware resources accessible by each piece of the software; and
a timer that counts an execution time for each piece of the software in the arithmetic section,
the method comprising the steps of:
intermittently executing safety unit software for performing the functional safety control in the arithmetic section of each of the first semiconductor chip and the second semiconductor chip;
performing separation such that i) a setting correctness diagnosis is performed to diagnose correctness of an access limit set value that is a set value of an access limit imposed by the space domain separation hardware at switching of the software executed in the arithmetic section, ii) the access limit set value is rewritten in response to an issuance of an interrupt request of processing of one of the safety unit software and non-safety unit software, wherein the non-safety unit software does not perform functional safety control, and iii) a separation signature value indicating operation history information on the setting correctness diagnosis and the rewriting is generated;
making self-diagnosis such that whether the safety unit software has normally run is diagnosed based on a safety unit signature value that describes operation history information on the safety unit software, the information being generated by the safety unit software; and
making mutual diagnosis such that mutual diagnosis signature values including the separation signature value and the safety unit signature value of the semiconductor chip are generated, the first semiconductor chip and the second semiconductor chip transmit and receive the mutual diagnosis signature values to and from each other, and correctness of the mutual diagnosis signature value received from the other is diagnosed.

16. The safety control method according to claim 15, wherein in the mutual diagnosis, timing of reception of the mutual diagnosis signature value from the other semiconductor chip is acquired based on a time generated by the timer of the semiconductor chip, and correctness of the timing of reception is diagnosed.

17. The safety control method according to claim 15, wherein the timer counts an elapsed time from start of execution of the software, and when the count value reaches a window time determined for each piece of the software, the arithmetic section forcibly performs the separation in the arithmetic section.

18. The safety control method according to claim 15, wherein in the setting correctness diagnosis in the separation, first diagnosis is performed to confirm that a first access limit set value is unchanged, the first access limit set value being provided as an access limit set value of the space domain separation hardware set for first software executed by the arithmetic section before the software executed by the arithmetic section is switched.

19. The safety control method according to claim 18, wherein in the setting correctness diagnosis in the separation,
wherein second diagnosis is performed to confirm accessibility to an accessible area set based on the first access limit set value and denied access to an access prohibited area set based on the first access limit set value, and wherein third diagnosis is performed to confirm accessibility to an accessible area set based on a second access limit set value that is an access limit set value of the space domain separation hardware set for second software executed in the arithmetic section after the software executed by the arithmetic section is switched, and denied access to an access prohibited area set based on the second access limit set value.

20. A functional safety program in a functional safety system, the functional safety system comprising:
    a first semiconductor chip configured to perform functional control for controlling a circuit to be controlled and functional safety control for safety control on the functional control; and
    a second semiconductor chip configured to perform at least the functional safety control on the functional control,
wherein the first semiconductor chip and the second semiconductor chip each includes:
    an arithmetic section that executes pieces of software in a timesharing manner;
    a plurality of hardware resources used by the software executed in the arithmetic section;
    space domain separation hardware that limits access to the hardware resources accessible by each piece of the software; and
    a timer that counts an execution time for each piece of the software in the arithmetic section,
wherein a safety control program is executed in the arithmetic section of the first semiconductor chip and the arithmetic section of the second semiconductor chip,
wherein the safety control program includes a first safety control program executed on the first semiconductor chip and a second safety control program executed on the second semiconductor chip,
wherein the first safety control program and the second safety control program intermittently execute safety unit software for the functional safety program in a predetermined cycle, in the respective arithmetic sections of the first and second semiconductor chips,
wherein separation is performed such that i) a setting correctness diagnosis is performed to diagnose correctness of an access limit set value that is a set value of an access limit imposed by the space domain separation hardware at switching of the software executed in the arithmetic section, ii) the access limit set value is rewritten in response to an issuance of an interrupt request of processing of one of the safety unit software and non-safety unit software, wherein the non-safety unit software does not perform functional safety control, and iii) a separation signature value indicating operation history information on the setting correctness diagnosis and the rewriting is generated,
wherein self-diagnosis is made such that whether the safety unit software has normally run is diagnosed based on a safety unit signature value that describes operation history information on the safety unit software, the information being generated by the safety unit software, and
wherein mutual diagnosis is made such that mutual diagnosis signature values including the separation signature value and the safety unit signature value of the semiconductor chip are generated, the first semiconductor chip and the second semiconductor chip transmit and receive the mutual diagnosis signature values to and from each other, and correctness of the mutual diagnosis signature value received from the other is diagnosed.

* * * * *